US011886102B2

(12) United States Patent
Hsieh et al.

(10) Patent No.: US 11,886,102 B2
(45) Date of Patent: Jan. 30, 2024

(54) ILLUMINATION SYSTEM AND PROJECTION DEVICE

(71) Applicant: Coretronic Corporation, Hsin-Chu (TW)

(72) Inventors: Chi-Tang Hsieh, Hsin-Chu (TW); Chih-Hsien Tsai, Hsin-Chu (TW); Mei-Chun Shih, Hsin-Chu (TW); Wei-Chen Hsiao, Hsin-Chu (TW); Shun-Tai Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/232,140

(22) Filed: Apr. 15, 2021

(65) Prior Publication Data
US 2021/0405515 A1 Dec. 30, 2021

(30) Foreign Application Priority Data
Jun. 29, 2020 (CN) .......................... 202010606453.4

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2013* (2013.01); *G03B 21/2053* (2013.01)

(58) Field of Classification Search
CPC .............. G03B 21/204; G03B 21/2013; G03B 21/2053; G03B 33/08; G03B 21/206; G02B 26/008
See application file for complete search history.

(56) References Cited

U.S. PATENT DOCUMENTS

2015/0176813 A1* 6/2015 De Vaan ................. F21S 10/02
                                                                  362/84
2019/0227416 A1* 7/2019 Pan ..................... G03B 21/2013
(Continued)

FOREIGN PATENT DOCUMENTS

CN          103324015         9/2013
CN          103728824         4/2014
(Continued)

OTHER PUBLICATIONS

"Office Action of China Counterpart Application", dated Jul. 5, 2022, p. 1-p. 13.

*Primary Examiner* — Magda Cruz
(74) *Attorney, Agent, or Firm* — JCIPRNET

(57) ABSTRACT

An illumination system, configured to provide an illumination beam, is provided. The illumination system includes a first excitation light source, a wavelength conversion element, and a controller. The first excitation light source is configured to provide a first excitation beam. The wavelength conversion element is located on a transmission path of the first excitation beam. The wavelength conversion element includes multiple wavelength conversion regions and multiple non-wavelength conversion regions. The controller controls whether the first excitation light source emits light. During a first time interval, the controller turns off the first excitation light source. During a second time interval, the controller controls the first excitation light source to emit light. The first excitation beam is transmitted to one of the wavelength conversion regions to form a converted beam. The illumination beam includes the converted beam. Another illumination system and multiple projection devices are also provided.

19 Claims, 32 Drawing Sheets

(56) References Cited

U.S. PATENT DOCUMENTS

| | | | | |
|---|---|---|---|---|
| 2019/0227418 A1* | 7/2019 | Chang | .................. | G03B 21/142 |
| 2019/0331997 A1* | 10/2019 | Pan | ...................... | G03B 21/208 |
| 2019/0346752 A1* | 11/2019 | Pan | ...................... | G03B 21/204 |
| 2019/0369470 A1* | 12/2019 | Yang | ...................... | G02B 27/141 |
| 2019/0384150 A1* | 12/2019 | Tsai | ...................... | G03B 21/16 |
| 2020/0089091 A1* | 3/2020 | Jao | ...................... | G03B 21/2013 |
| 2020/0174355 A1 | 6/2020 | Liu et al. | | |
| 2020/0209726 A1* | 7/2020 | Lin | ...................... | G03B 21/2066 |
| 2020/0314396 A1* | 10/2020 | Fan | ...................... | H04N 9/3152 |
| 2020/0371413 A1* | 11/2020 | Pan | ...................... | H04N 9/3164 |

FOREIGN PATENT DOCUMENTS

| | | |
|---|---|---|
| CN | 108132576 | 6/2018 |
| CN | 108255001 | 7/2018 |
| CN | 109991800 | 7/2019 |
| CN | 110412818 | 11/2019 |
| JP | 2005221630 | 8/2005 |
| JP | 2005274656 | 10/2005 |
| TW | I570498 | 2/2017 |

\* cited by examiner

ILLUMINATION SYSTEM AND PROJECTION DEVICE

CROSS-REFERENCE TO RELATED APPLICATION

This application claims the priority benefit of China application serial no. 202010606453.4, filed on Jun. 29, 2020. The entirety of the above-mentioned patent application is hereby incorporated by reference herein and made a part of this specification.

BACKGROUND OF THE INVENTION

1. Field of the Invention

The invention relates to an illumination system and a projection device.

2. Description of Related Art

With the advancement of technologies, projectors are widely used in life, for example, may be used indoor, in movie theatres, outdoor, and in other different places. In the current projector market, pursing a high-brightness design becomes a trend. High-power laser light-emitting elements are usually used in projectors to achieve the high-brightness design. However, a high-brightness design generates a large amount of heat energy. In designing of fluorescent wheels of the current projectors, phosphor is usually coated on a rotary disk in a ring shape, and a motor drives the rotary disk to rotate, so as to avoid a decline of wavelength conversion efficiency or even burning as a result of continuous irradiation of a strong energy laser on a specific region of the phosphor. However, using high-power laser light-emitting elements still generates excessive laser energy. Even if the fluorescent rotary disk rotates continuously, the rotary disk still has an increasing temperature as a result of continuous absorption of laser energy, reducing the wavelength conversion efficiency of the phosphor.

The information disclosed in this "Background of the invention" section is only for enhancement of understanding of the background of the described technology and therefore it may contain information that does not form the prior art that is already known to a person of ordinary skill in the art. Further, the information disclosed in the "Background of the invention" section does not mean that one or more problems to be resolved by one or more embodiments of the invention was acknowledged by a person of ordinary skill in the art.

SUMMARY OF THE INVENTION

The invention provides an illumination system and a plurality of projection devices with good reliability and optical efficiency.

Other objectives and advantages of the invention may be further understood from the technical features disclosed in the invention.

In order to achieve one, a part, or all of the foregoing or other objectives, an embodiment of the invention provides an illumination system for providing an illumination beam. The illumination system includes a first excitation light source, a wavelength conversion element, and a controller. The first excitation light source is configured to provide a first excitation beam. The wavelength conversion element is located on a transmission path of the first excitation beam. The wavelength conversion element includes a plurality of wavelength conversion regions and a plurality of non-wavelength conversion regions alternately arranged in a circumferential direction. The controller controls whether the first excitation light source emits light. During a first time interval, the controller turns off the first excitation light source. During a second time interval, the controller controls the first excitation light source to emit light, and the first excitation beam is transmitted to one of the wavelength conversion regions to form a converted beam. The illumination beam includes the converted beam.

In order to achieve one, a part, or all of the foregoing or other objectives, an embodiment of the invention provides a projection device, including the above illumination system, a light valve, and a projection lens. The light valve is disposed on a transmission path of the illumination beam and is configured to convert the illumination beam into an image beam. The projection lens is disposed on a transmission path of the image beam.

In order to achieve one, a part, or all of the foregoing or other objectives, an embodiment of the invention provides an illumination system for providing an illumination beam. The illumination system includes a first excitation light source, a wavelength conversion element, and a controller. The first excitation light source is configured to provide a first excitation beam. The wavelength conversion element is located on a transmission path of the first excitation beam. The wavelength conversion element includes a plurality of wavelength conversion regions and a plurality of non-wavelength conversion regions alternately arranged in a circumferential direction. Each of the non-wavelength conversion regions includes a hollow region. The controller controls whether the first excitation light source emits light. During a first time interval, the controller controls the first excitation light source to emit light, so that the first excitation beam is transmitted to and penetrates one of the non-wavelength conversion regions. During a second time interval, the controller controls the first excitation light source to emit light, and the first excitation beam is transmitted to one of the wavelength conversion regions to form a converted beam. The illumination beam includes the converted beam.

In order to achieve one, a part, or all of the foregoing or other objectives, an embodiment of the invention provides a projection device, including the above illumination system, a light valve, and a projection lens. The light valve is disposed on a transmission path of the illumination beam and is configured to convert the illumination beam into an image beam. The projection lens is disposed on a transmission path of the image beam.

Based on the above, in the illumination system and the projection device in the embodiments of the invention, the first excitation beam penetrates the hollow region or is controlled not to irradiate a solid material. In these manners, reliability of the wavelength conversion element is prevented from being affected by heat generated when the first excitation beam irradiates a solid material. Therefore, the illumination system and the projection device can have good reliability and optical efficiency.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
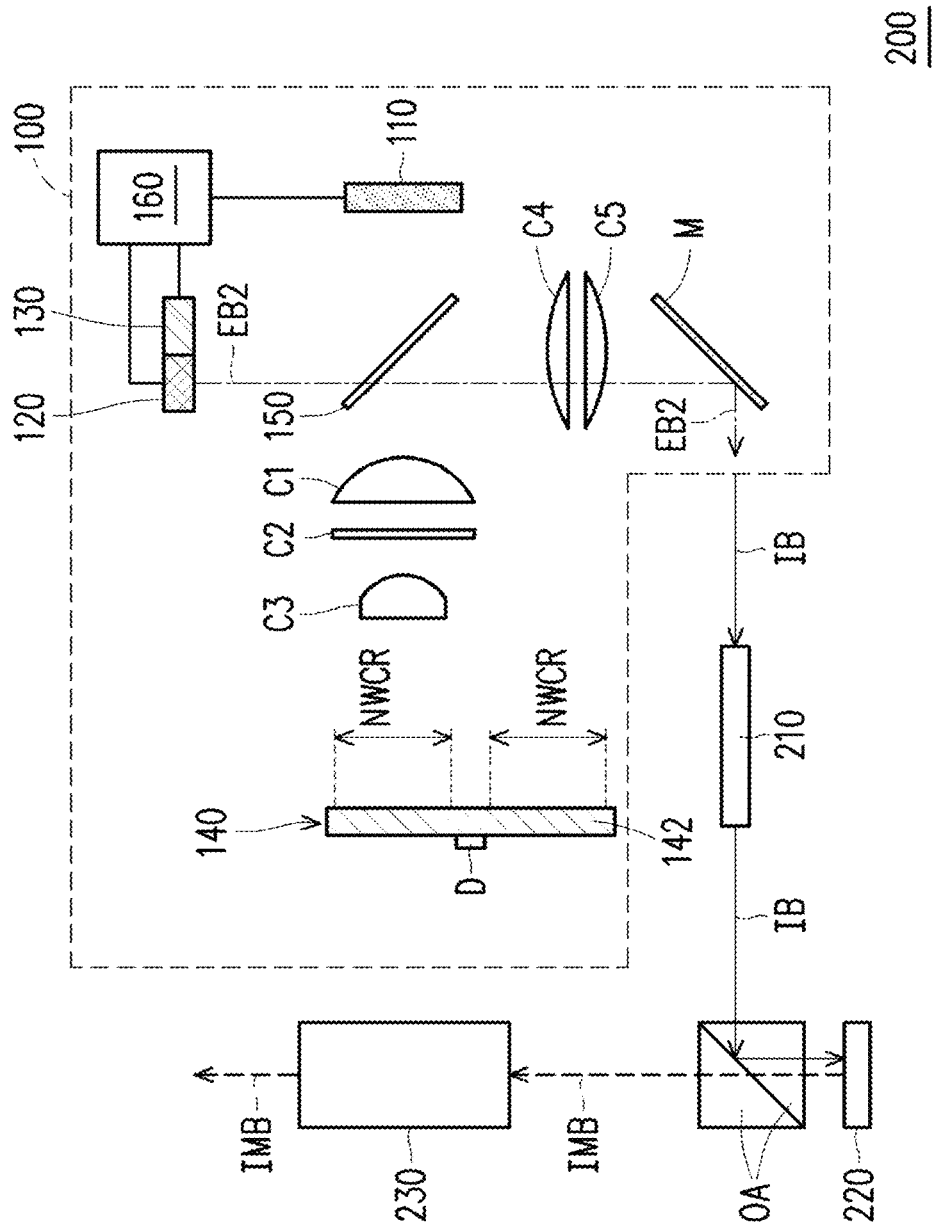
FIG. 1A to FIG. 1H are schematic diagrams of optical paths of a projection device during different time intervals respectively according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive. In addition, the terms "different colors" mentioned in this specification or the claim scope of the patent application also include the cases where the colors are very similar but the peak wavelengths are different. The peak wavelength is defined as the wavelength corresponding to the maximum light intensity in the light intensity spectrum.

FIG. 1A to FIG. 1H are schematic diagrams of optical paths of a projection device during different time intervals respectively according to an embodiment of the invention. FIG. 2A is a schematic top view of a wavelength conversion element in FIG. 1A to FIG. 1H. FIG. 2B is a schematic cross-sectional view along a line A-A' in FIG. 2A.

Referring to FIG. 1A to FIG. 1H, in the embodiment, a projection device 200 includes an illumination system 100, a light homogenizing element 210, a light valve 220 and a projection lens 230. The illumination system 100 is configured to provide an illumination beam IB, and includes a first excitation light source 110, a second excitation light source 120, a supplementary light source 130, a wavelength conversion element 140, a beam splitting element 150, and a controller 160. The above elements are described in detail in the following paragraphs.

The elements in the illumination system 100 are described first.

The light source may be an array arranged by one or more light-emitting elements, or may be an optical element assembly consisting of one or more light-emitting elements and mirrors or lenses, but the invention is not limited thereto. The light-emitting element includes a laser diode (LD). In the embodiment, the first excitation light source 110 and the second excitation light source 120 each include one or more blue laser light emitting elements that can emit blue light. The first excitation light source 110 provides a first excitation beam EB1, and the second excitation light source 120 provides a second excitation beam EB2. The first excitation light source 110 and the second excitation light source 120 may also be considered as blue light sources as a result of emitting blue light. Peak wavelengths of the first excitation light source 110 and the second excitation light source 120 are 455 nanometers and 465 nanometers, respectively. The supplementary light source 130 includes, for example, one or more red laser light emitting elements that can emit red light, and provides a supplementary beam SB. The supplementary light source 130 may also be considered as a red light source as a result of emitting red light. A peak wavelength of the supplementary light source 130 is, for example, 610 nanometers. The peak wavelength is defined as a wavelength corresponding to maximum light intensity in a light intensity spectrum.

A main function of the wavelength conversion element 140 is an optical element configured to convert a short-wavelength beam passing through the wavelength conversion element 140 into a long-wavelength beam with respect to the short-wavelength beam. Referring to FIG. 2A and FIG. 2B, in the embodiment, the wavelength conversion element 140 is, for example, a reflective fluorescent wheel including a rotary disk 142, a first wavelength conversion material 144, a second wavelength conversion material 146, and a drive element D. The rotary disk 142 is, for example, a rotary disk that can reflect a beam. The wavelength conversion material 144 is disposed on a part of the rotary disk 142 in a ring shape, and a part of the rotary disk 142 is exposed. The first wavelength conversion material 144 and the second wavelength conversion material 146 are, for example, photoluminescent materials, such as fluorescent gel layers or quantum dots, but are not limited thereto. When the first wavelength conversion material 144 and the second wavelength conversion material 146 are irradiated by a short-wavelength beam, photoluminescence occurs and a long-wavelength beam is emitted (a wavelength conversion phenomenon). Regions defined by the first wavelength conversion material 144 and the second wavelength conversion material 146 are also referred to as wavelength conversion regions WCR, which are referred to as, for example, a first wavelength conversion region WCR1 and a second wavelength conversion region WCR2, respectively. In the embodiment, the first wavelength conversion material 144 and the second wavelength conversion material 146 are, for example, fluorescent glue layers doped with green and yellow phosphors, respectively. In addition, in a circumferential direction CD passing through the first wavelength conversion material 144 and the second wavelength conversion material 146, a region defined by a part of the rotary disk 142 exposed from the first wavelength conversion material 144 and the second wavelength conversion material 146 can reflect a beam without wavelength conversion. The region is also referred to as a non-wavelength conversion region NWCR or light reflection region. In other words, in the embodiment, the non-wavelength conversion region NWCR includes a solid material, for example, a reflective solid material. The drive element D is coupled to the rotary disk 142 and is configured to control the rotary disk 142 to rotate. The drive element D is, for example, a motor.

From another point of view, the wavelength conversion element 140 includes a plurality of wavelength conversion regions WCR and non-wavelength conversion regions NWCR alternately arranged in the circumferential direction CD. For example, there are two wavelength conversion regions WCR and two non-wavelength conversion regions NWCR, but the invention is not limited thereto. Boundaries between the first wavelength conversion region WCR1 and two non-wavelength conversion regions NWCR adjacent to the first wavelength conversion region WCR1 are marked as B1 and B2, respectively, and boundaries between the second wavelength conversion region WCR2 and the two non-wavelength conversion regions NWCR adjacent to the second wavelength conversion region WCR2 are marked as B3 and B4, respectively.

The light splitting element 150 generally refers to an optical element having a light splitting function. In the embodiment, the light splitting element is a dichroic mirror (DM), which has wavelength selectivity, and is a dichroic sheet that splits light by using a wavelength/color, but the invention is not limited thereto. In the embodiment, the light splitting element 150 is designed to be able to reflect yellow and green light and penetrable by light of other colors, but the invention is not limited thereto.

The controller 160 is coupled to the first excitation light source 110, the second excitation light source 120, and the supplementary light source 130, and is configured to control whether the first excitation light sources 110, the second excitation light source 120, and the supplementary light source 130 emit light. The controller 160 may be a calculator, a microprocessor (Micro Controller Unit, MCU), a central processing unit (CPU), or other programmable controllers (Microprocessor), a digital signal processor (DSP), a programmable controller, an application specific integrated circuit (ASIC), a programmable logic device (PLD), or other similar devices, but the invention is not limited thereto.

Next, other elements in the projection device 200 are described.

The light homogenizing element 210 refers to an optical element that can homogenize a beam passing through the light homogenizing element 210. In the embodiment, the light homogenizing element 210 is, for example, an integration rod, a lens array, or other optical elements having a light homogenizing effect, but the invention is not limited thereto.

The light valve 220 refers to any of the following spatial light modulators: a digital micro-mirror device (DMD), a liquid crystal-on-silicon panel (LCOS Panel), and a liquid crystal panel (LCD), etc., but the invention is not limited thereto. In the embodiment, the light valve 220 is a digital micromirror device, and is configured to convert the illumination beam IB into an image beam IMB.

The projection lens 230 is, for example, a combination of one or more optical lenses with diopters. The optical lenses include, for example, various combinations of non-planar lenses such as biconcave lenses, biconvex lenses, concave-convex lenses, convex-concave lenses, plano-convex lenses, and plano-concave lenses, etc. A shape and a type of the projection lens 230 are not limited in the invention. In the embodiment, the projection lens 230 is configured to project the image beam IMB onto a projection medium (for example, a projection screen).

In addition, in the embodiment, a reflecting mirror M and lenses C1 to C5 may be selectively added inside the illumination system 100 to adjust an optical path. In addition, an optical prism set OA may be selectively added inside the projection device 200 to adjust the optical path. The invention is not limited to numbers of mirrors M, lenses C1 to C5, and optical prism sets OA.

An arrangement relationship among the above elements is described in detail in the following paragraphs.

Referring to FIG. 1A to FIG. 1H, in the embodiment, the wavelength conversion element 140 is disposed on a transmission path of the first excitation beam EB1 and away from transmission paths of the second excitation beam EB2 and the supplementary beam SB. The beam splitting element 150 is disposed in a region among the first excitation light source 110, the second excitation light source 120, the supplementary light source 130, the wavelength conversion element 140, and the lens C3, and is located on transmission paths of the first excitation beam EB1, the second excitation beam EB2, and the supplementary beam SB. The light homogenizing element 210 is disposed on a transmission path of the illumination beam IB. The light valve 220 is disposed on the transmission path of the illumination beam IB. The projection lens 230 is disposed on a transmission path of the image beam IMB.

Figure 3:
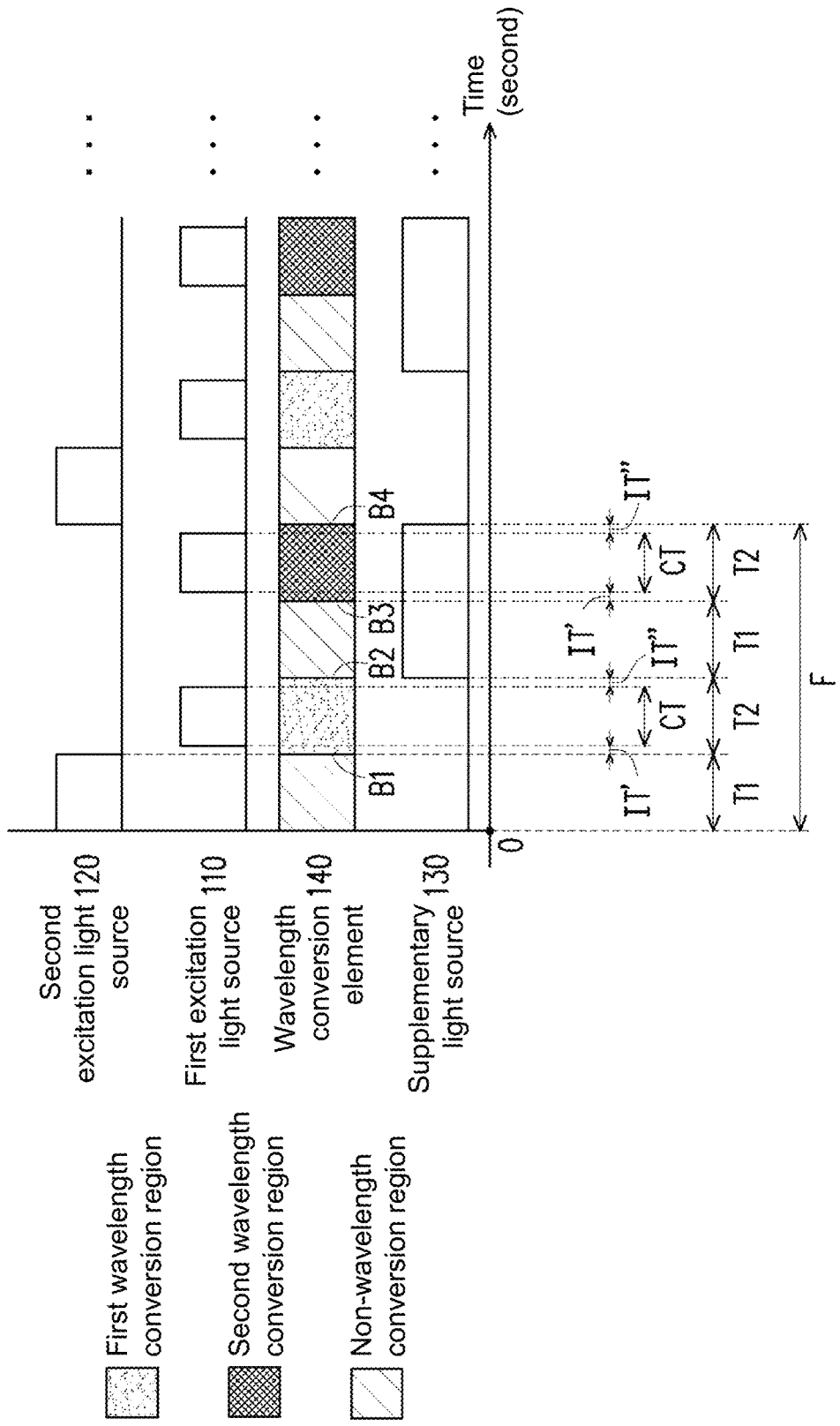
FIG. 3 is a timing diagram of different elements in the projection device in FIG. 1A to FIG. 1H.

FIG. 3 is a timing diagram of different elements in the projection device in FIG. 1A to FIG. 1H. A horizontal axis in FIG. 3 represents time, and the unit of the horizontal axis in FIG. 3 is second.

An optical effect of the projection device 200 within one frame F is described in the following paragraphs. One frame F includes two first time interval T1 and two second time interval T2 alternating in timing, that is, one frame F represents a time required for the wavelength conversion element 140 to rotate by one circle. During the first time interval T1, the wavelength conversion element 140 is controlled so that the non-wavelength conversion region NWCR thereof is switched into an irradiation range of the first excitation light source 110, and during the second time interval T2, the wavelength conversion element 140 is controlled so that the wavelength conversion region WCR thereof is switched into the irradiation range of the first excitation light source 110. Since the wavelength conversion element 140 in the embodiment has two wavelength conversion regions WCR and two non-wavelength conversion regions NWCR, one frame F has alternating two first time intervals T1 and two second time intervals T2. In other embodiments, the first time interval T1 and the second time interval T2 may also vary according to numbers of the wavelength conversion regions WCR and the non-wavelength conversion regions NWCR of the wavelength conversion element 140. The invention is not limited thereto.

Figure 2B:
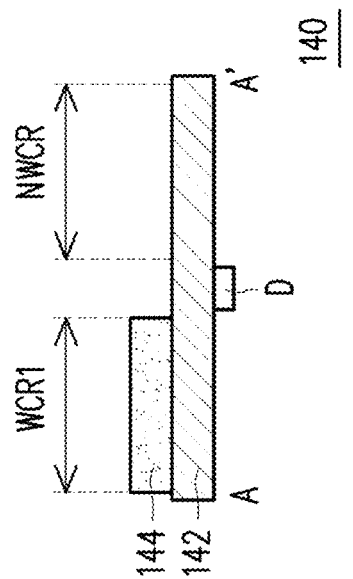
FIG. 2B is a schematic cross-sectional view along a line A-A' in FIG. 2A.
Figure 2A:
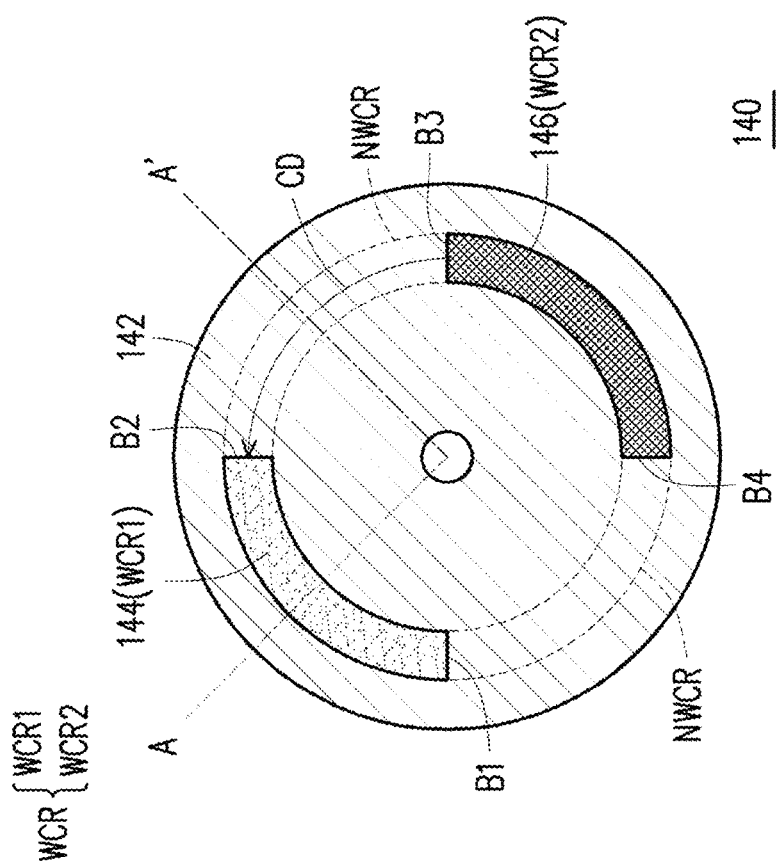
FIG. 2A is a schematic top view of a wavelength conversion element in FIG. 1A to FIG. 1H.

Referring to FIG. 1A, FIG. 2A, and FIG. 3, first, a position of the wavelength conversion element 140 corresponding to a start moment of the first time interval (that is, zero seconds in FIG. 3) is defined as a boundary B4. During the first time interval T1, the controller 160 turns off the first excitation light source 110 and the supplementary light source 130, and controls the second excitation light source 120 to emit the second excitation beam EB2. At this time, the non-wavelength conversion region NWCR enters the irradiation range of the first excitation light source 110 due to rotation of the wavelength conversion element 140. The second excitation beam EB2 sequentially penetrates the beam splitting element 150 and lenses C4 and C5 to be transmitted to the reflecting mirror M, and is reflected by the reflecting mirror M, so as to be emitted from the illumination system 100. In this case, the illumination beam IB output by the illumination system 100 during the first time interval T1 includes the second excitation beam EB2.

Figure 1B:
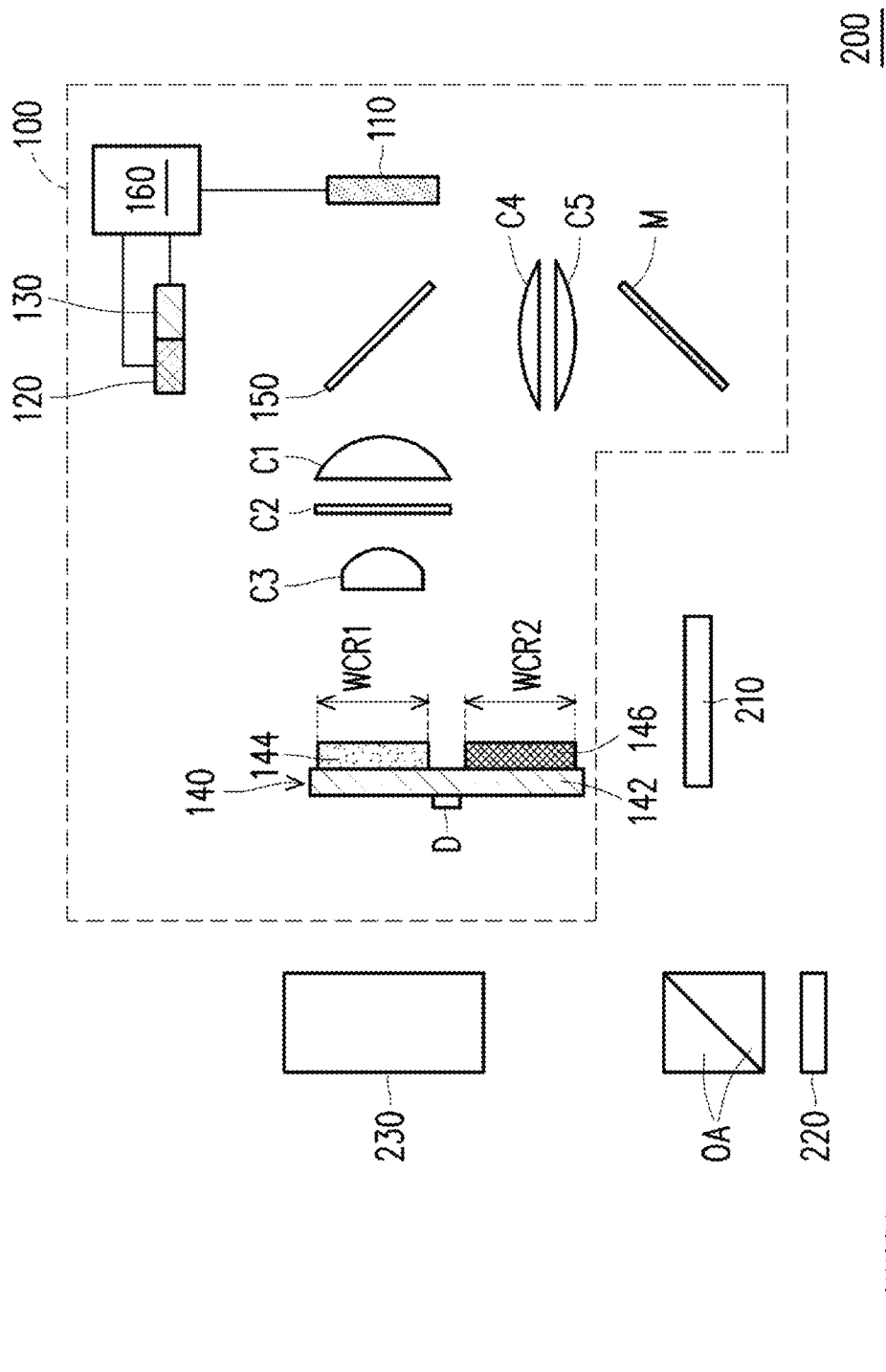
Figure 1C:
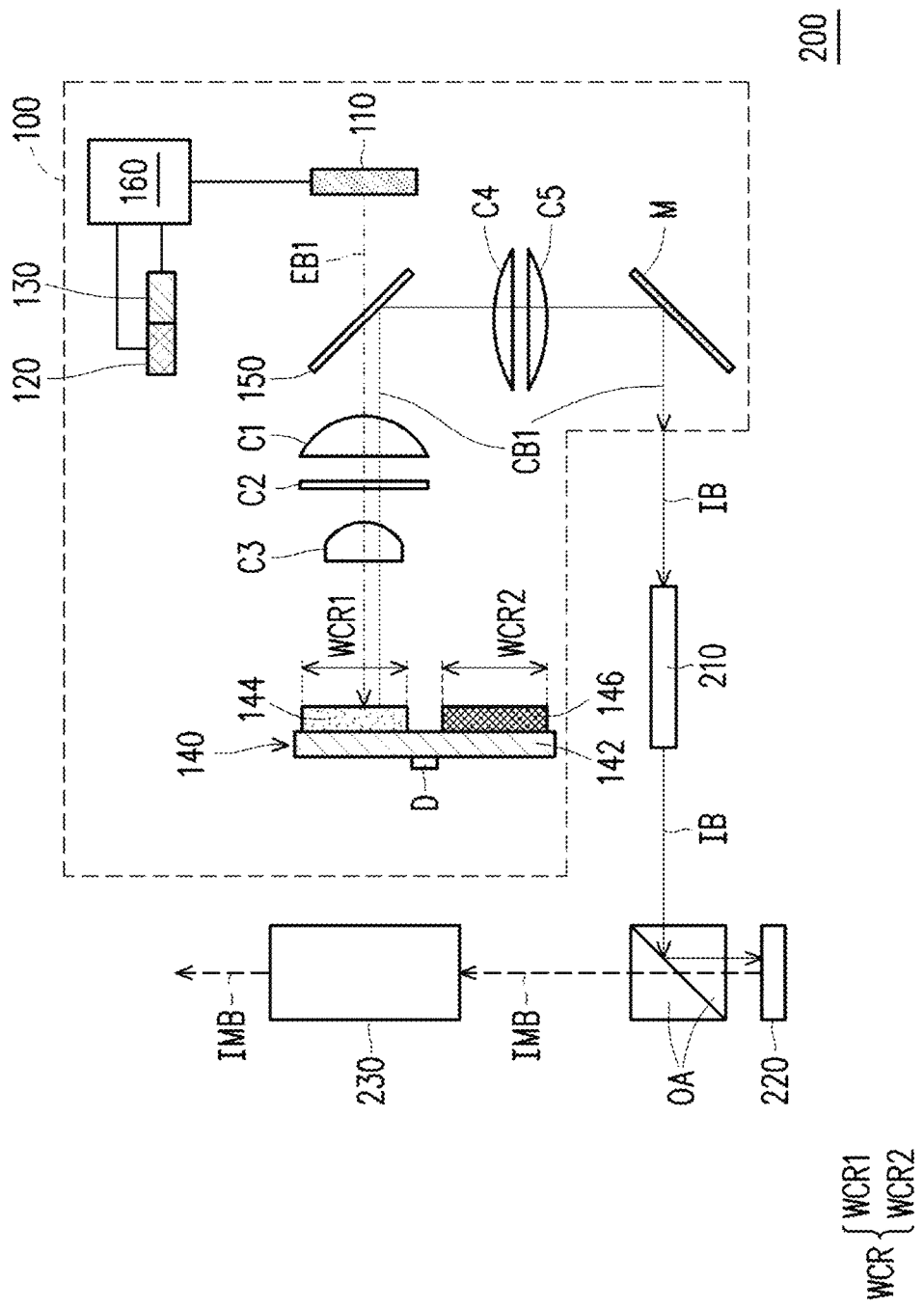

Referring to FIG. 1B to FIG. 1C and FIG. 3, during the second time interval T2, according to different operation modes of the elements, the second time interval T2 further includes a color time interval CT1 and two idle time intervals IT' and IT". The two idle time intervals IT' and IT" are before and after the color time interval CT, respectively, and the two idle time intervals IT' and IT" correspond to the boundaries B1 and B2 (shown in FIG. 2A and FIG. 3) between one wavelength conversion region WCR1 of the wavelength conversion regions WCR and non-wavelength conversion regions NWCR adjacent to the one wavelength conversion region WCR1, respectively. The optical effect of the projection device 100 is described below according to different time intervals.

Referring to FIG. 1B, FIG. 2A, and FIG. 3, during the idle time interval IT' (which may also be referred to as a previous idle time interval) of the second time interval T2, the controller 160 turns off the first excitation light source 110, the second excitation light source 120, and the supplementary light source 130. At the start moment of the previous idle time interval IT', the boundary B1 (shown in FIG. 2A and FIG. 3) between the first wavelength conversion region WCR1 and a non-wavelength conversion region NWCR adjacent to the first wavelength conversion region WCR1 enters the irradiation range of the first excitation light source 110 due to rotation of the wavelength conversion element 140, that is, a correspondence between the idle time interval IT' and the boundary B1 is shown. At this time, the illumination system 100 does not output the illumination beam IB.

Referring to FIG. 1C and FIG. 3, during the color time interval CT of the second time interval T2, the controller 160 controls the first excitation light source 110 to emit the first excitation beam EB1, and turns off the second excitation light source 120 and the supplementary light source 130. At this time, the first wavelength conversion region WCR1 enters the transmission path of the first excitation beam EB1 due to rotation of the wavelength conversion element 140. The first excitation beam EB1 sequentially penetrates the light splitting element 150 and the lenses C1 to C3, and is transmitted to the first wavelength conversion region WCR1 of the wavelength conversion element 140. The first excitation beam EB1 excites the first wavelength conversion material 144 in the first wavelength conversion region WCR1 to form a converted beam CB1. A color of the converted beam CB1 is, for example, green. The converted beam CB1 then sequentially penetrates the lenses C3 to C1 and is transmitted to the beam splitting element 150, and is reflected by the beam splitting element 150, and then sequentially penetrates the lenses C4 and C5, and is transmitted to a reflector M and reflected by the reflector M, so as to be emitted from the illustration system 100. At this time, the illumination beam IB output by the illumination system 100 includes the converted beam CB1.

Figure 1D:
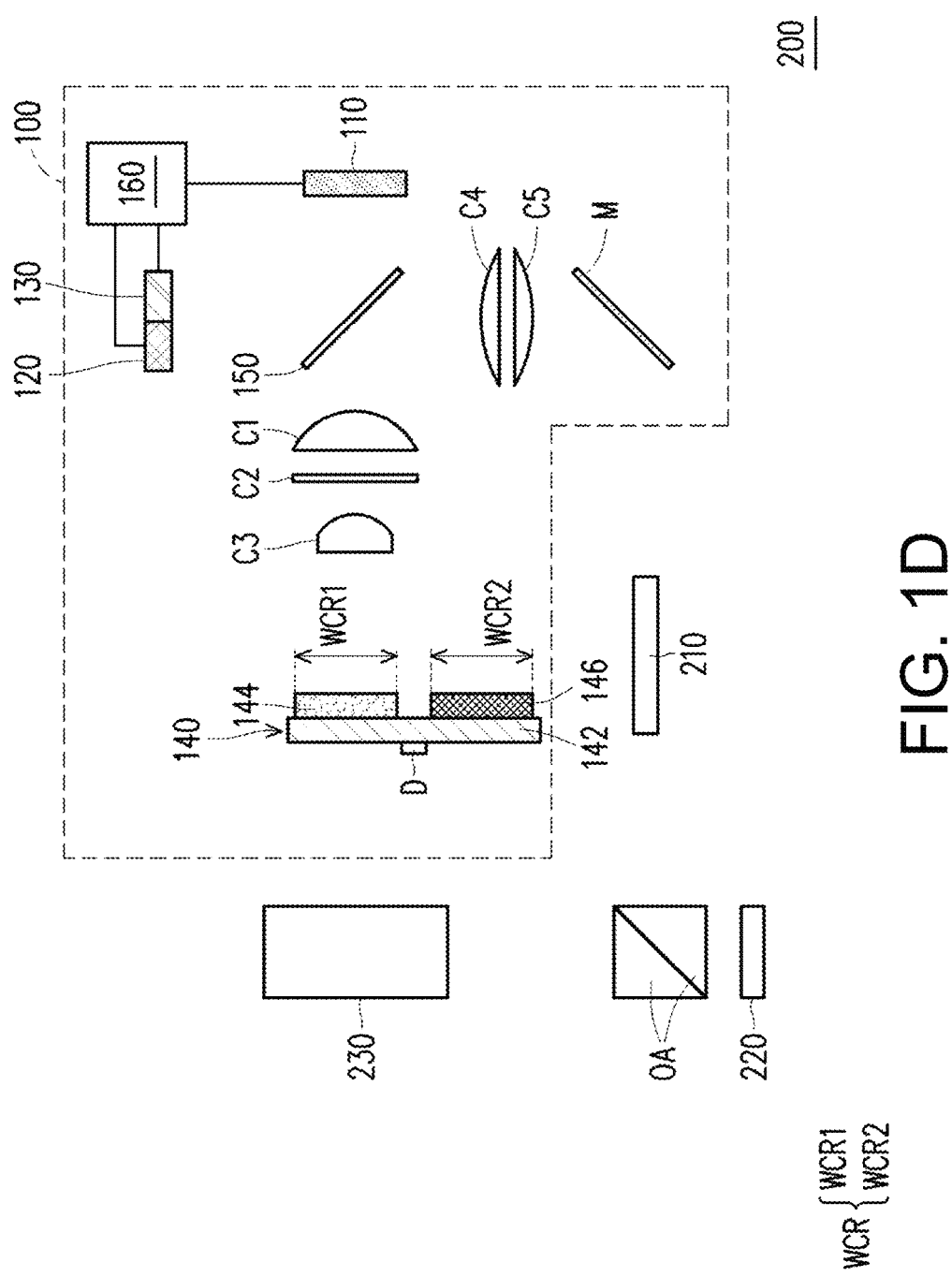

Referring to FIG. 1D, FIG. 2A, and FIG. 3, during the idle time interval IT" (also referred to as a post idle time interval) of the second time interval T2, the controller 160 turns off the first excitation light source 110, the second excitation light source 120, and the supplementary light source 130. At an end moment of the post idle time interval IT", the boundary B2 (shown in FIG. 2A and FIG. 3) between the first wavelength conversion region WCR1 and the non-wavelength conversion region NWCR adjacent to the first wavelength conversion region WCR1 enters the irradiation range of the first excitation light source 110 due to rotation of the wavelength conversion element 140, that is, a correspondence between the idle time interval IT" and the boundary B2 is shown. At this time, the illumination system 100 does not output the illumination beam IB.

Figure 1E:
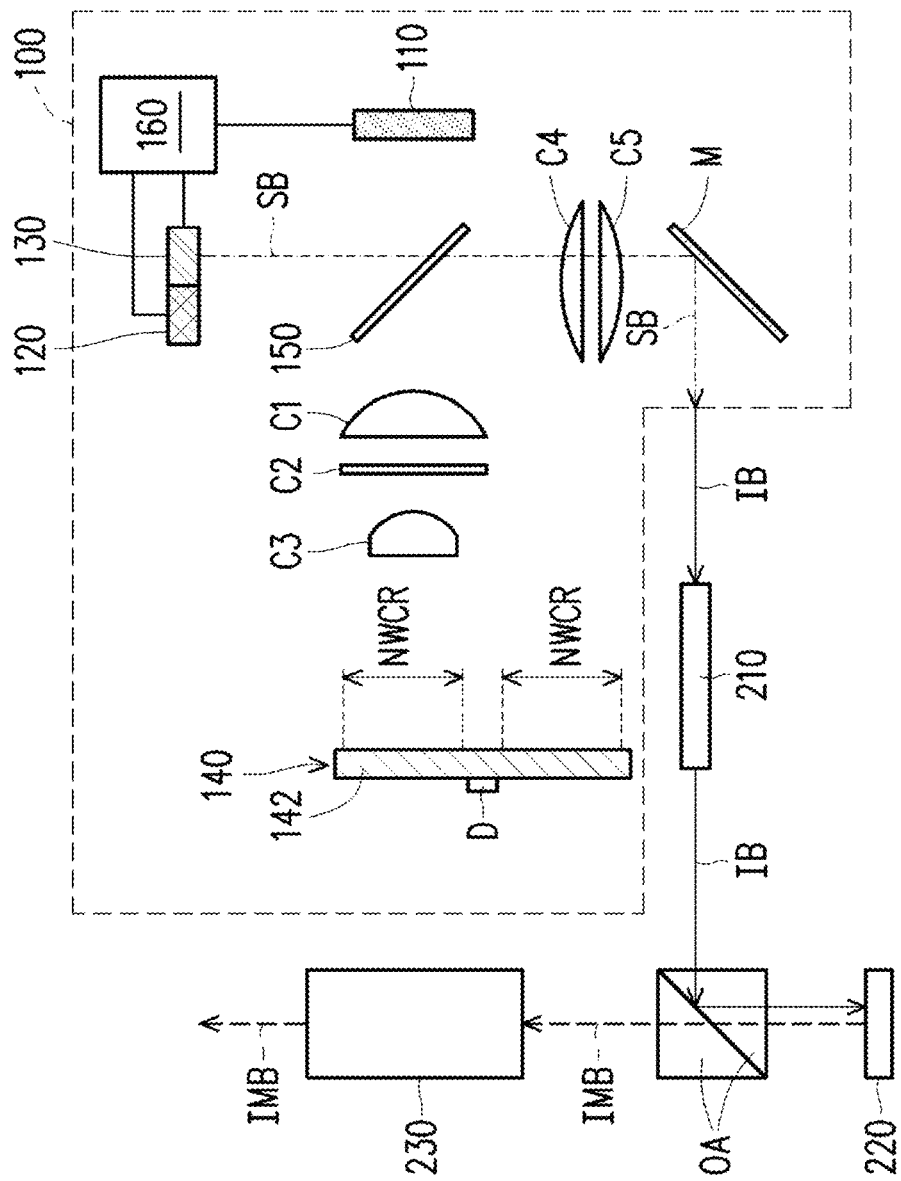

Referring to FIG. 1E and FIG. 3, during the first time interval T1, the controller 160 turns off the first excitation light source 110 and the second excitation light source 120, and controls the supplementary light source 130 to emit the supplementary beam SB. At this time, the non-wavelength conversion region NWCR enters the irradiation range of the first excitation light source 110 due to rotation of the wavelength conversion element 140. The supplementary beam SB sequentially penetrates the beam splitting element 150 and the lenses C4 and C5 and is transmitted to the mirror M, and is then reflected by the mirror M, so as to be emitted from the illumination system 100. An illumination beam IB output by the illumination system 100 during the first time interval T1 includes the supplementary beam SB.

Figure 1F:
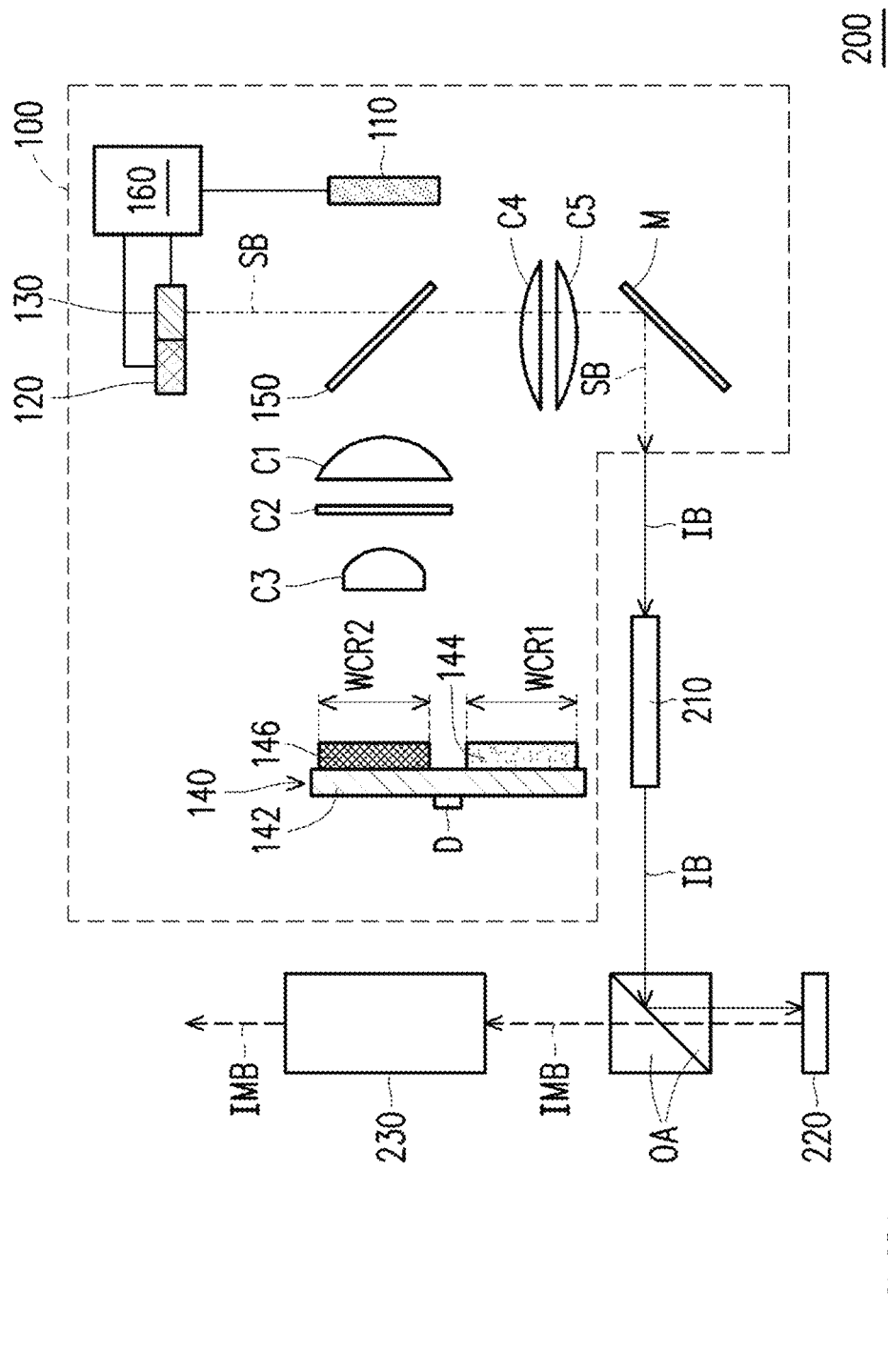

Referring to FIG. 1F, FIG. 2A, and FIG. 3, during the previous idle time interval IT' of the second time interval T2, the controller 160 turns off the first excitation light source 110 and the second excitation light source 120, but turns on the supplementary light source 130. At the start moment of the previous idle time interval IT', a boundary B3 between the second wavelength conversion region WCR2 and a non-wavelength conversion region NWCR adjacent to the second wavelength conversion region WCR2 enters the irradiation range of the first excitation light source 110 due to rotation of the wavelength conversion element 140. At this time, the illumination beam IB output by the illumination system 100 includes the supplementary beam SB.

Figure 1G:
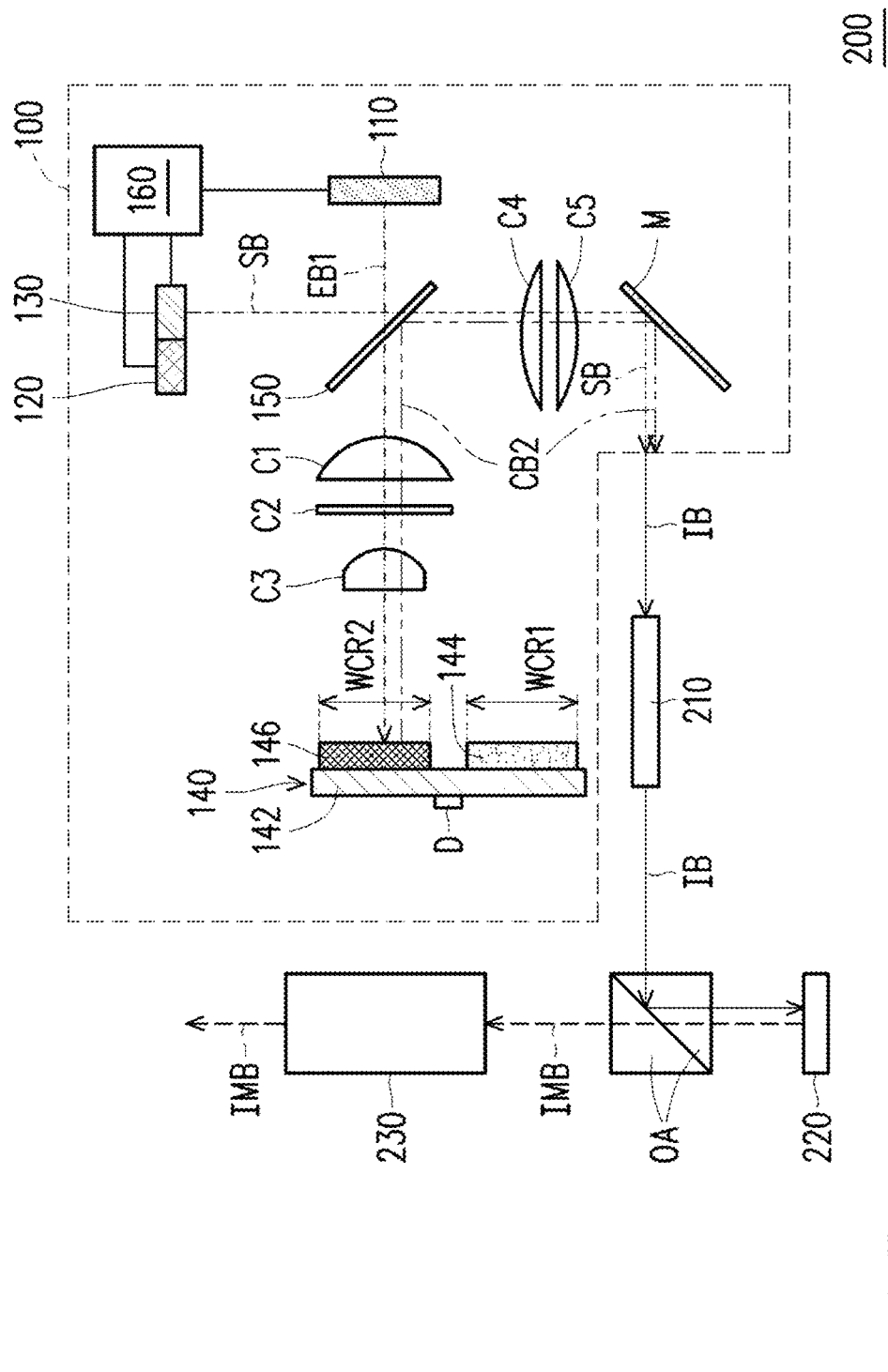

Referring to FIG. 1G and FIG. 3, during the color time interval CT of the second time interval T2, the controller 160 turns off the second excitation light source 120, and controls the first excitation light source 110 and the supplementary light source 130 to emit the first excitation beam EB1 and the supplementary beam SB. At this time, the second wavelength conversion region WCR2 enters the transmission path of the first excitation beam EB1 due to rotation of the wavelength conversion element 140. The first excitation beam EB1 excites the second wavelength conversion material 146 in the second wavelength conversion region WCR2 to form a converted beam CB2. For optical paths of the first excitation beam EB1, the converted beam CB2, and the supplementary beam SB, refer to the above descriptions, and the descriptions thereof are omitted herein. The illumination beam IB output by the illumination system 100 during the color time interval CT1 includes the converted beam CB2 and the supplementary beam SB.

Figure 1H:
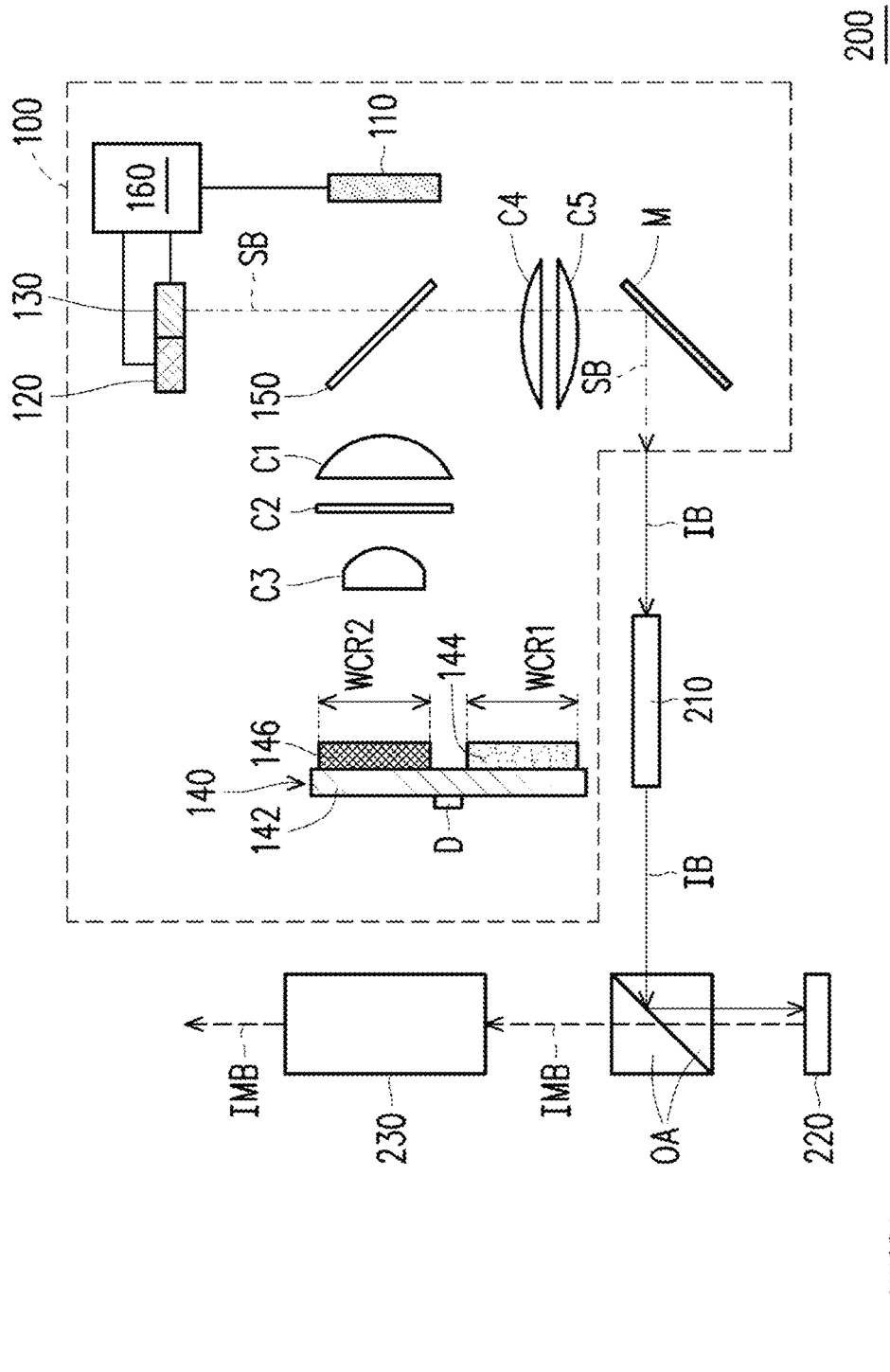

Referring to FIG. 1H, FIG. 2A, and FIG. 3, during the post idle time interval IT" of the second time interval T2, the controller 160 turns off the first excitation light source 110 and the second excitation light source 120, but turns on the supplementary light source 130. At an end moment of the post idle time interval IT", a boundary B4 (shown in FIG. 2A and FIG. 3) between the second wavelength conversion region WCR2 and an a non-wavelength conversion region NWCR adjacent to the second wavelength conversion region WCR2 enters the irradiation range of the first excitation light source 110 due to rotation of the wavelength conversion element 140. At this time, the illumination beam IB output by the illumination system 100 includes the supplementary beam SB.

So far, description of the optical effect of the projection device 200 during the time interval of one frame F is substantially completed.

According to the above, during the two idle time intervals IT' and IT" of the second time interval T2, the controller 160 turns off the first excitation light source 110, so that duration in which the first excitation light source 110 is turned on (the color time interval CT) is less than the second time interval T2 (that is, the time interval during which the non-wavelength conversion region NWCR enters the irradiation range of the first excitation light source 110). In this way, color mixing caused by irradiation of the first excitation beam EB1 on the boundary between the wavelength conversion region WCR and the non-wavelength conversion region NWCR can be avoided. Therefore, the light output by the projection device 200 has a more pure color. However, in other embodiments, the idle time intervals IT' and IT" may also be 0 according to configurations and setting of other elements, but the invention is not limited thereto.

It should be noted that, in the embodiment, since the first wavelength conversion material 144 and the second wavelength conversion material 146 respectively include fluorescent glue layers that can emit light of different colors (for example, green light and yellow light), colors of the converted beams CB1 and CB2 formed during different color time intervals CT1 and CT2 are different. In other words, colors of the converted beams CB1 and CB2 formed by the first wavelength conversion region WCR1 and the second wavelength conversion region WCR2 respectively are different from each other.

Referring to FIG. 1A, FIG. 1C, and FIG. 1E to FIG. 1H again, after being output from the illumination system 100, the illumination beam IB is transmitted to the light homogenizing element 210 to be homogenized by the light homogenizing element 210, and is then guided to the light valve 220 by the optical prism set OA. Referring to FIG. 3, the light valve 220 converts the illumination beams IB of different colors into image beams IMB of different colors during different time intervals. The image beam IMB then penetrates the optical prism set OA and is transmitted to the projection lens 230. The projection lens 230 transmits the image beam IMB to the projection medium, so that a user can view the projection image.

According to the above, in the illumination system 100 and the projection device 200 in the embodiment, during the first time interval T1, the non-wavelength conversion region NWCR of the wavelength conversion element 140 enters a pre-irradiation region of the first excitation light source 110, and the controller 160 turns off the first excitation light source 110 at this time. During the second time interval T2, the wavelength conversion region WCR of the wavelength conversion element 140 enters an irradiation region of the first excitation light source 110, and the controller 160 controls the first excitation light source 110 to emit the first excitation beam EB1 to be transmitted to the wavelength conversion element 140. In other words, when the wavelength conversion region WCR enters the irradiation region of the first excitation light source 110, the controller 160 controls the first excitation light source 110 to emit light, and when the non-wavelength conversion region NWCR enters the irradiation region of the first excitation light source 110, the controller controls the first excitation light source to stop emitting light. In short, the first excitation light source 110 is turned on corresponding to the wavelength conversion region WCR within one frame F. In this way, duration in which the first excitation beam EB1 irradiates the solid material (the reflecting rotary disk 142) of the wavelength conversion element 140 can be reduced, so that heat generated thereby is also reduced, not only preventing the heat from affecting reliability of the wavelength conversion element 140, but also saving energy of the first excitation light source 110. Therefore, the illumination system 100 and the projection device 200 can have good reliability and optical efficiency.

Furthermore, since the non-wavelength conversion region NWCR of the wavelength conversion element 140 is not covered by the first wavelength conversion material 144 and the second wavelength conversion material 146, the solid material (the reflecting rotary disk 142) in the non-wavelength conversion region NWCR is in direct contact with air, helping accelerate heat dissipation.

It needs to be noted herein that a part of the content of the foregoing embodiments is still used in the following embodiments, and the descriptions of the same technical content are omitted. For the same element names, refer to the part of the content of the foregoing embodiments, and the descriptions thereof are omitted in the following embodiments.

FIG. 4 to FIG. 8 are schematic top views of wavelength conversion elements according to different embodiments of the invention.

Figure 4:
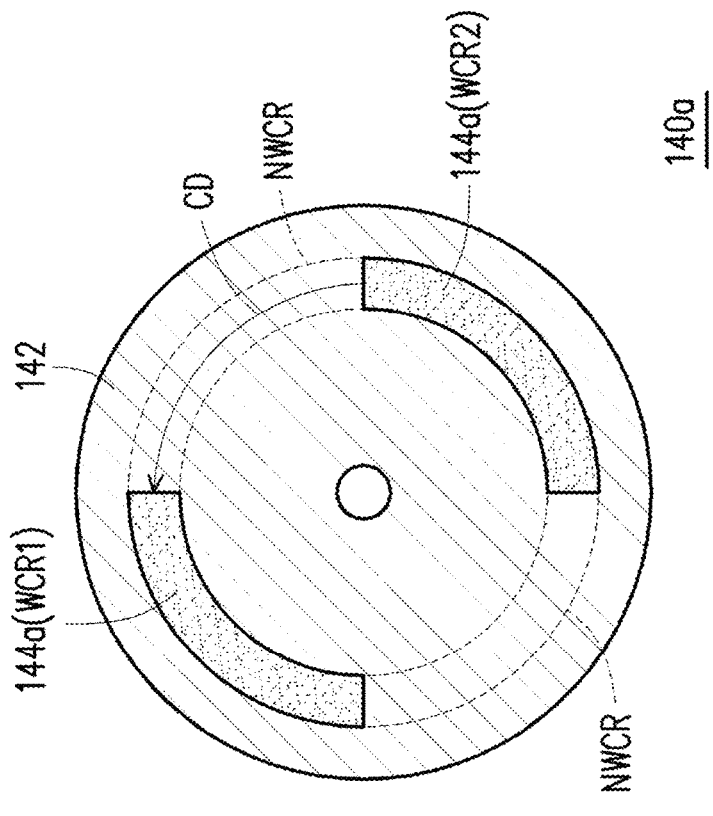
FIG. 4 to FIG. 8 are schematic top views of wavelength conversion elements according to different embodiments of the invention.

Referring to FIG. 4, a wavelength conversion element 140a in FIG. 4 is substantially similar to the wavelength conversion element 140 in FIG. 1A to FIG. 1H and FIG. 2A to FIG. 2B, and a main difference is that colors of beams emitted by wavelength conversion materials in the wavelength conversion element 140a through excitation are the same. In other words, in the embodiment in FIG. 4, colors of converted beams (not shown in FIG. 4) formed by the wavelength conversion regions (for example, the first wavelength conversion region WCR1 and the second wavelength conversion region WCR2) respectively shown in the figure are the same. In detail, the wavelength conversion element 140a includes a wavelength conversion material 144a, for example, a fluorescent glue layer including green phosphor, but the invention is not limited thereto.

Figure 5:
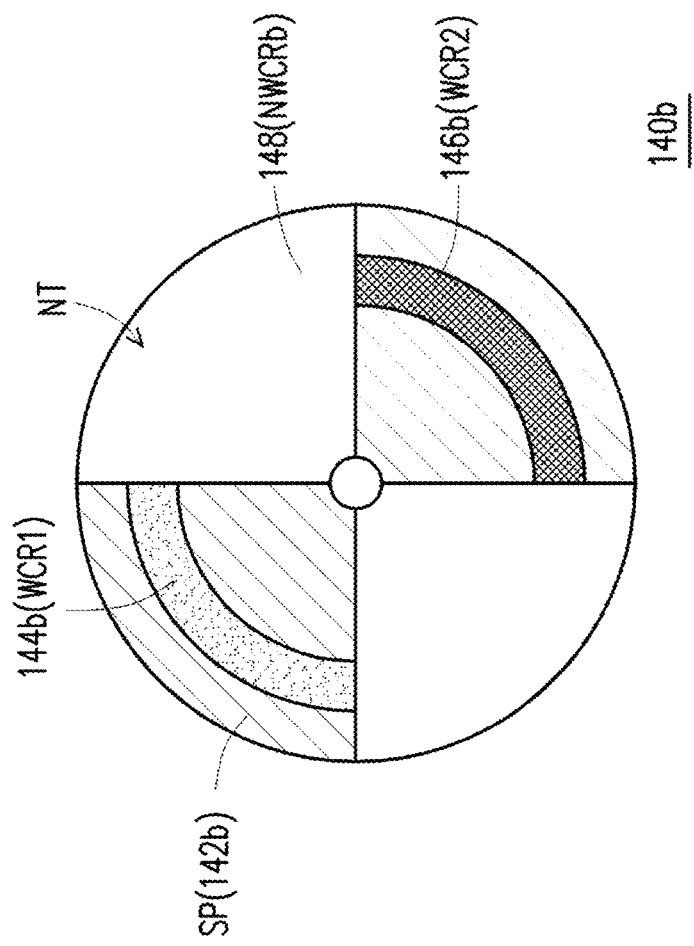

Referring to FIG. 5, a wavelength conversion element 140b in FIG. 5 is substantially similar to the wavelength conversion element 140 in FIG. 1, and a main difference is that a shape of the wavelength conversion element 140b is slightly different. In detail, the wavelength conversion element 140b is, for example, a transmissive fluorescent wheel, and a reflecting rotary disk 142b includes a plurality of fan-shaped portions SP (for example, two fan-shaped portions). A notch NT is formed between adjacent two fan-shaped portions SP. In addition, the wavelength conversion element 140b further includes a plurality of light-transmissive solid materials 148, for example, glass. The light-transmissive solid materials 148 are embedded in the notches NT, respectively. A region in which the light-transmissive solid material 148 is located defines a non-wavelength conversion region NWCRb. A first wavelength conversion material 144b and a second wavelength conversion material 146b are disposed on the fan-shaped portions SP respectively to define a wavelength conversion region WCR.

Figure 6:
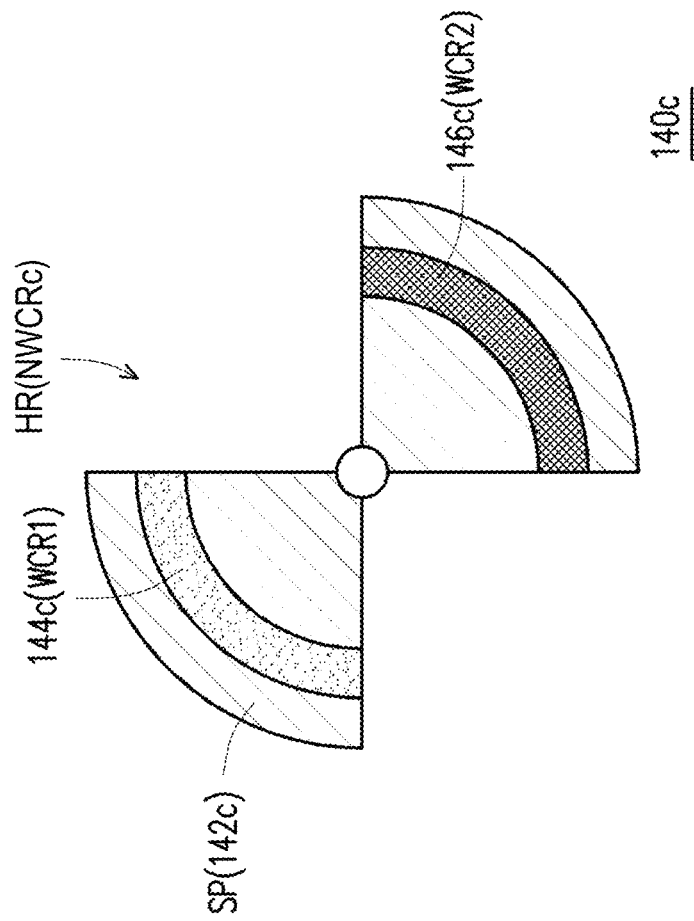

Referring to FIG. 6, a wavelength conversion element 140c in FIG. 6 is substantially similar to the wavelength conversion element 140b in FIG. 5, and a main difference is that the wavelength conversion element 140c has no light-transmissive solid materials 148. In detail, a rotary disk 142c of the wavelength conversion element 140c includes a plurality of fan-shaped portions SP (for example, two fan-shaped portions), and a hollow region HR exists between adjacent two fan-shaped portions SP. A region in which each hollow region HR is located defines a non-wavelength conversion region NWCRc. In other embodiments, a light-transmissive solid material may also be disposed in the hollow region HR, but the invention is not limited thereto. The first wavelength conversion material 144c and the second wavelength conversion material 146c are disposed on the fan-shaped portions SP respectively to define a wavelength conversion region WCR.

Figure 7:
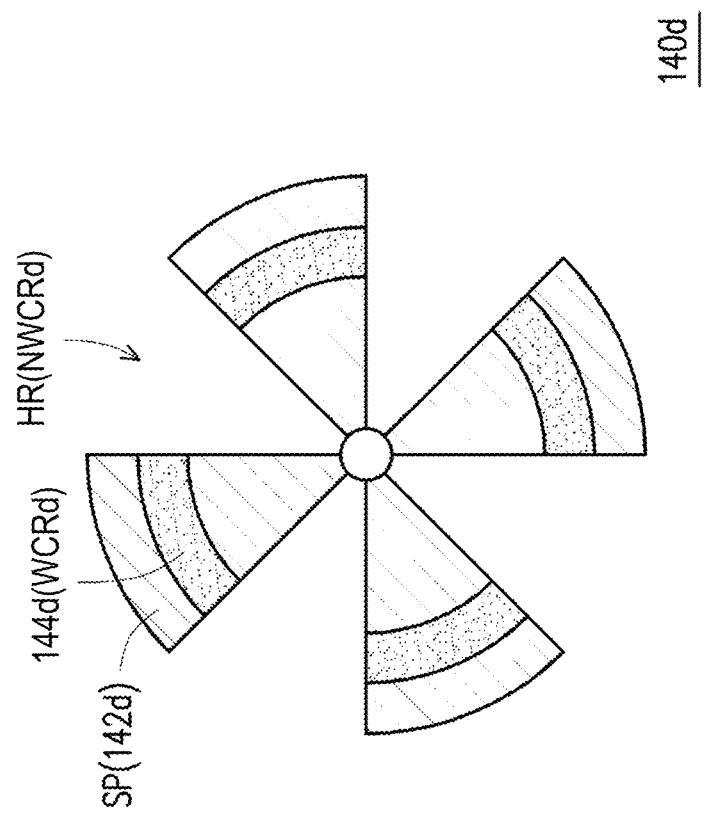

Referring to FIG. 7, a wavelength conversion element 140d in FIG. 7 is substantially similar to the wavelength conversion element 140c in FIG. 6, and a main difference is that a wavelength conversion element 140d has more wavelength conversion regions WCRd and non-wavelength conversion regions NWCRd, for example, four wavelength conversion regions and four non-wavelength conversion regions, and a wavelength conversion material 144d of the wavelength conversion element 140d includes a fluorescent glue layer doped with green phosphor. In other words, a rotary disk 142d of the wavelength conversion element 140d includes four fan-shaped portions SP, and wavelength conversion materials 144d of the same type are disposed on the fan-shaped portions SP. However, in other embodiments, the wavelength conversion element may also be doped with fluorescent glue layers with phosphors of different colors, but the invention is not limited thereto.

Figure 8:
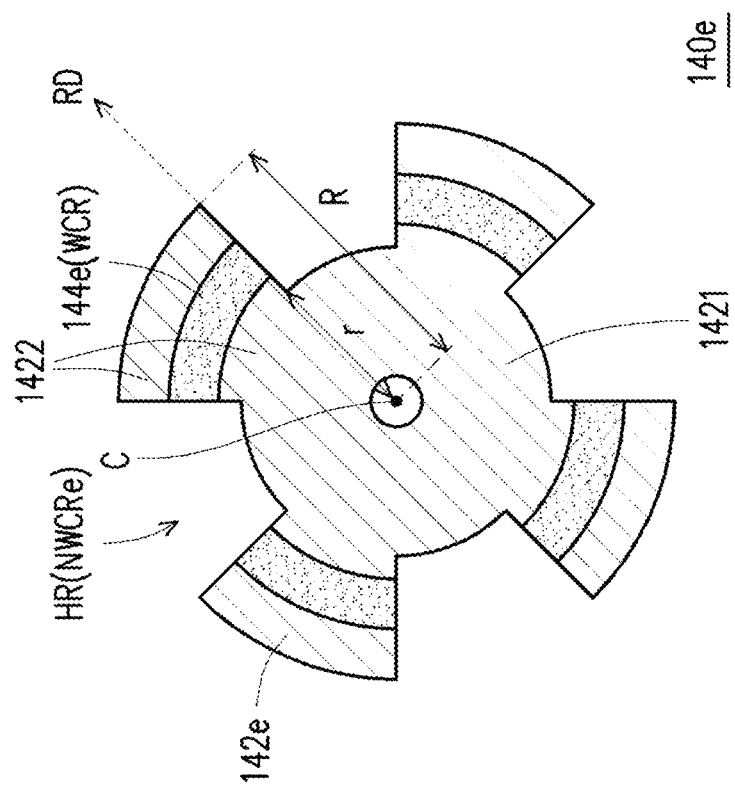

Referring to FIG. 8, a wavelength conversion element 140e in FIG. 8 is substantially similar to the wavelength conversion element 140c in FIG. 6, and a main difference is that a rotary disk 142e of the wavelength conversion element 140e further includes a body portion 1421 and a plurality of extension portions 1422 extending outward (protruding) from the body portion 1421 and separated from each other in the circumferential direction. The body portion 1421 is, for example, disc-shaped and is configured to maintain balance of the entire wavelength conversion element 140e. In a radial direction RD, a radius r of the body portion 1421 and a radius R from an outer edge of the extension portion 1422 to an axis center C may also satisfy the following condition: R>r>0.5R. According to the condition, the wavelength conversion element 140e can have relatively good structural strength. A wavelength conversion material 144e is disposed on the extension portions 1422 to define a plurality of wavelength conversion regions WCR respectively. A hollow region HR between adjacent two extension portions 1422 is defined as a non-wavelength conversion region NWCRe, that is, each non-wavelength conversion region NWCRe is located between adjacent two extension portions 1422. In other embodiments, a light-transmissive solid material may also be disposed in the hollow region HR, but the invention is not limited thereto.

According to the above, the design of the hollow region HR is introduced to the wavelength conversion elements 140c to 140e in the above embodiments, so that areas of sidewall surfaces of the reflecting rotary disks 142c to 142e exposed to outside are larger due to the design of the hollow region HR, facilitating heat dissipation. In addition, according to the design of the hollow region HR, overall appearances of the wavelength conversion elements 140c to 140e are similar to a fan. If the wavelength conversion element 140a is changed to the above wavelength conversion elements 140c to 140e, a wind flow generated during rotation may also be used to cool other elements (such as a light source) inside the projection device 200, so that heat dissipation efficiency of the projection device 200 can be further improved.

FIG. 9A to FIG. 9D are schematic diagrams of the optical paths of the projection device during different time intervals respectively according to another embodiment of the invention. FIG. 10 is a timing diagram of different elements in the projection device in FIG. 9A to FIG. 9D.

Referring to FIG. 6, FIG. 9A to FIG. 9D, and FIG. 10, a projection device 200f and an illumination system 100f in FIG. 9A to FIG. 9D are substantially similar to the projection device 200 and the illumination system 100 in FIG. 1A to FIG. 1D, and a main difference is that a wavelength conversion element 140c used in the illumination system 100f is in a shape of, for example, a rotary disk 142c with a hollow region HR. The wavelength conversion element 140c in FIG. 6 is used as an example herein. Moreover, the illumination system 100f further includes a light absorbing member 170, for example, a metal member coated with black paint, but the invention is not limited thereto. The light absorbing member 170 is located on a transmission path of a first excitation beam EB1 penetrating each non-wavelength conversion region NWCRc. In addition, a manner in which the controller 160 controls the first excitation light source 110 is also slightly different. A main difference is that during a time interval of one frame F, the controller 160 controls the first excitation light source 110 to continuously emit the first excitation beam EB1.

Optical effects of the projection device 200f during different time intervals are described in detail in the following paragraphs.

Figure 9A:
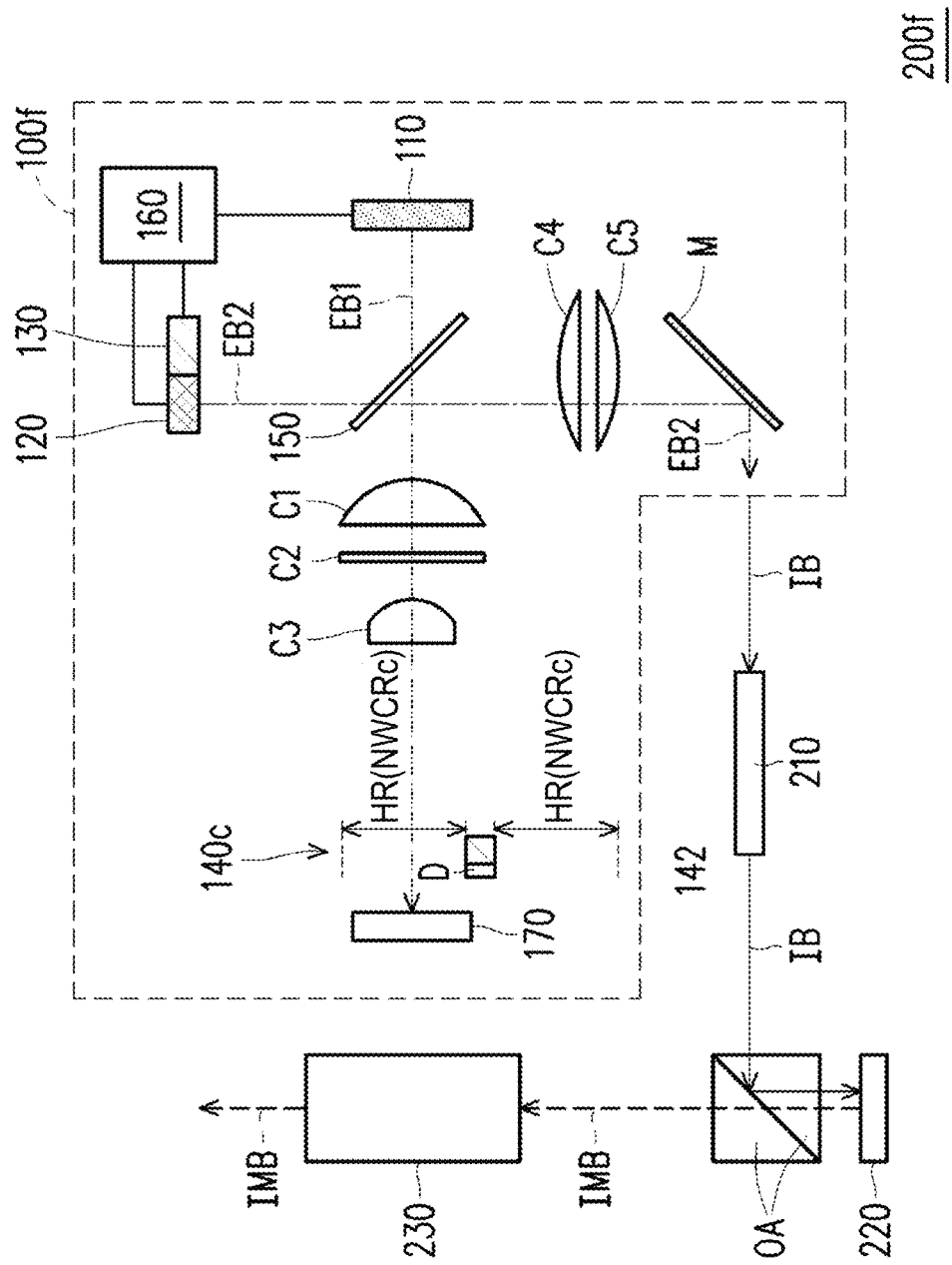
FIG. 9A to FIG. 9D are schematic diagrams of the optical paths of the projection device during different time intervals respectively according to another embodiment of the invention.
Figure 10:
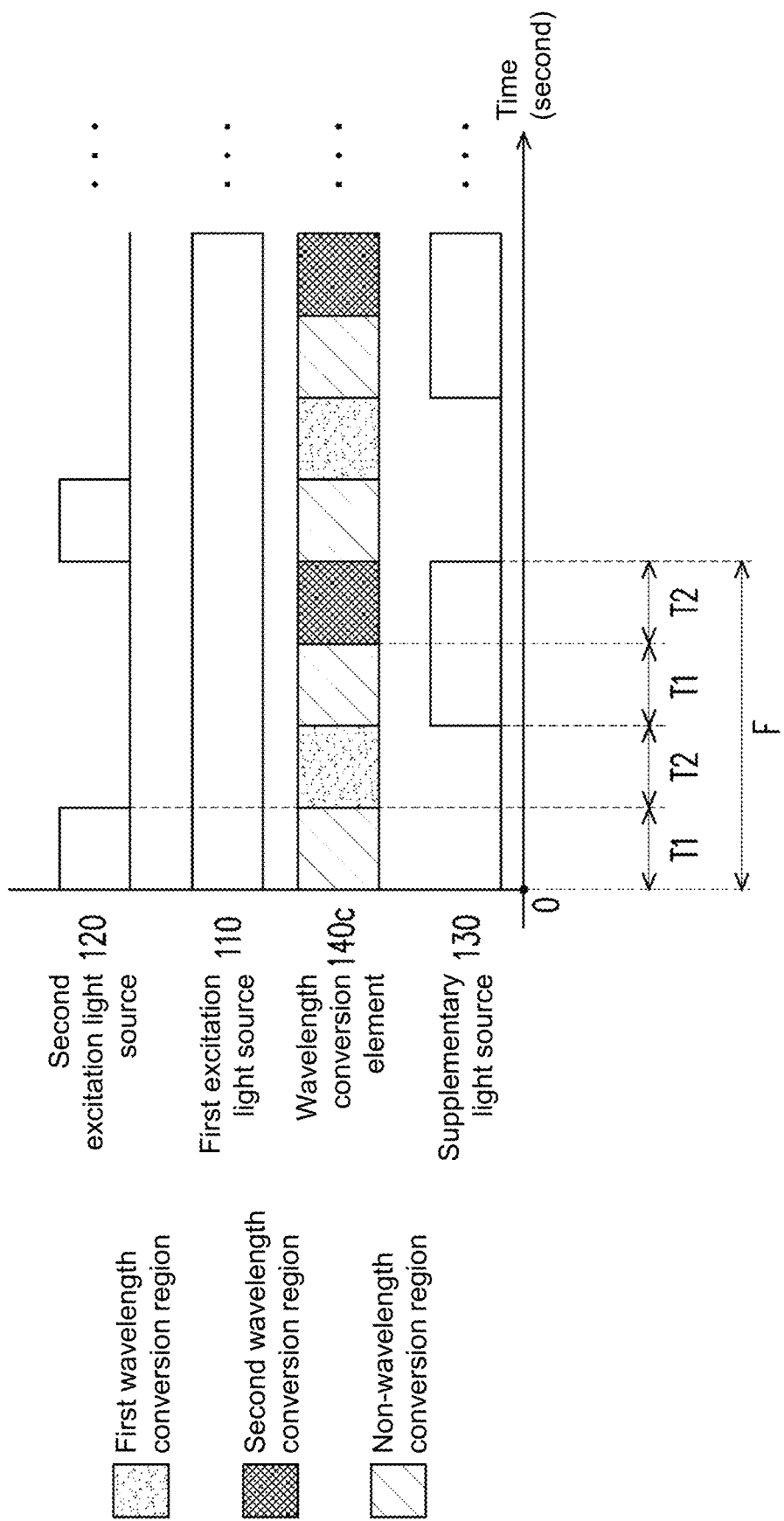
FIG. 10 is a timing diagram of different elements in the projection device in FIG. 9A to FIG. 9D.

Referring to FIG. 9A and FIG. 10 first, during the first time interval T1, the controller 160 controls the first excitation light source 110 and the second excitation light source 120 to emit a first excitation beam EB1 and a second excitation beam EB2, respectively, and turns off the supplementary light source 130. At this time, the non-wavelength conversion region NWCRc enters the transmission path of the first excitation beam EB1 due to rotation of the wavelength conversion element 140c. After the first excitation beam EB1 is emitted, the first excitation beam EB1 sequentially penetrates the light splitting element 150, the lenses C1 to C3, and the non-wavelength conversion region NWCRc to be transmitted to the light absorbing member 170, and is absorbed by the light absorbing member 170. Descriptions of an optical path of the second excitation beam EB2 are also similar to the descriptions in related paragraphs of FIG. 1A, and therefore the descriptions thereof are omitted herein. In this case, an illumination beam IB output by the illumination system 100f during the first time interval T1 includes the second excitation beam EB2. It should be noted that since a cross section in the first time interval T1 in FIG. 9A presents a non-wavelength conversion region NWCRc using a design of a hollow region HR, the wavelength conversion element 140c in FIG. 9A is partially blank.

Figure 9B:
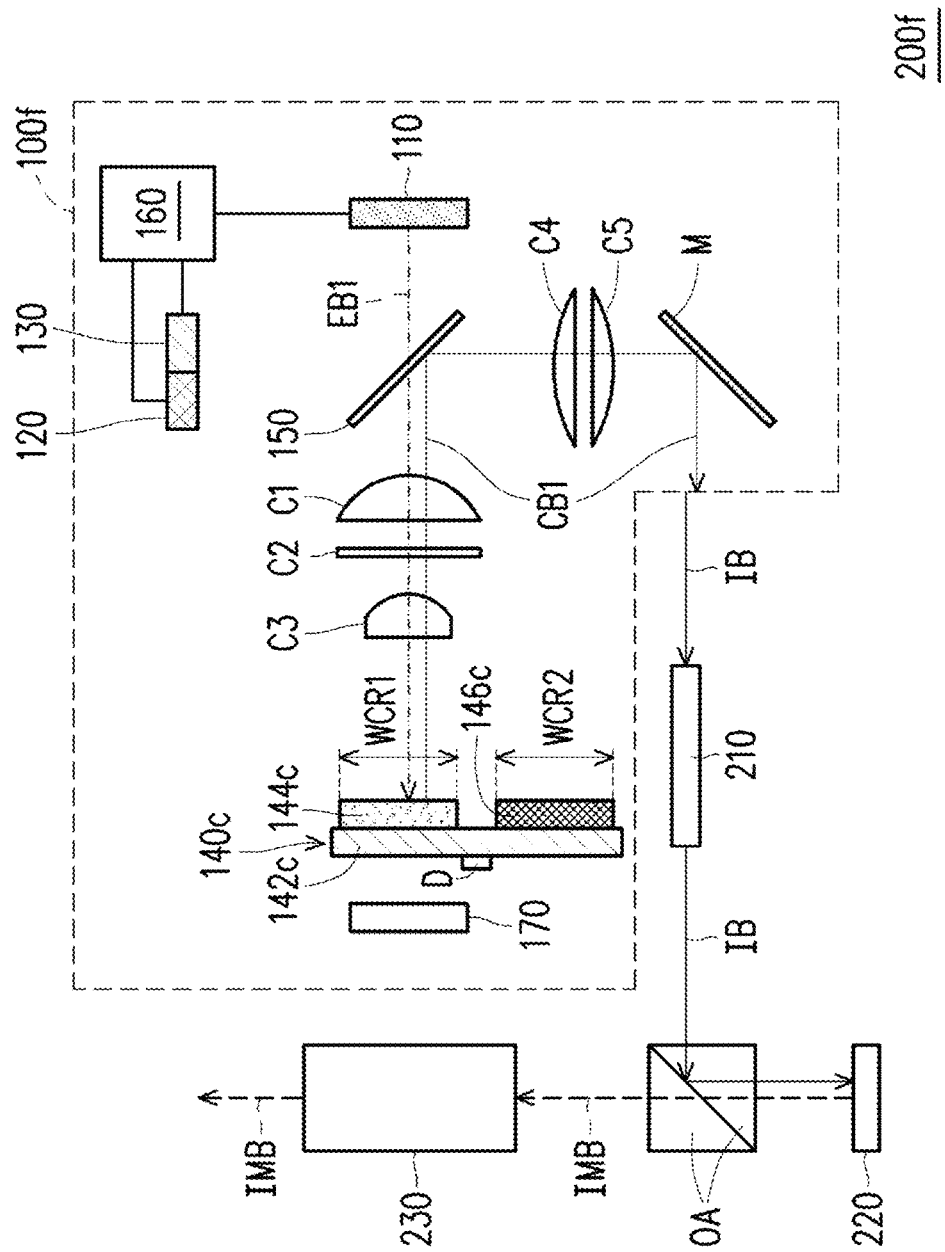

Referring to FIG. 9B and FIG. 10, during the second time interval T2, the controller 160 controls the first excitation light source 110 to emit light, and turns off the second excitation light source 120 and the supplementary light source 130. At this time, the first wavelength conversion region WCR1 enters the transmission path of the first excitation beam EB1 due to rotation of the wavelength conversion element 140c, so as to form a converted beam CB1. Descriptions of optical paths of the first excitation beam EB1 and the converted beam CB1 are similar to the descriptions of FIG. 1C, and therefore the descriptions thereof are omitted herein. At this time, the illumination beam IB output by the illumination system 100f includes the converted beam CB1.

Figure 9C:
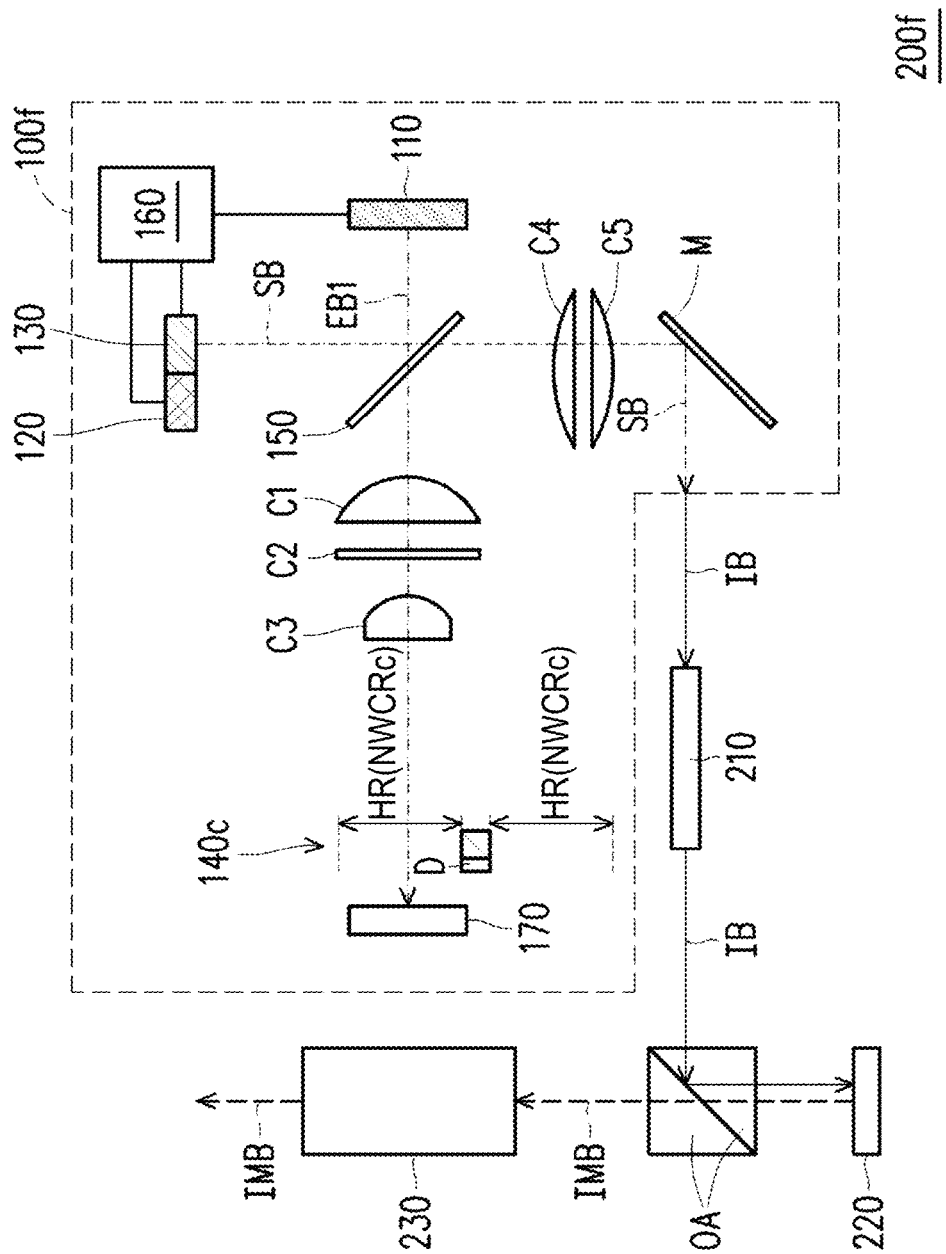

Referring to FIG. 9C and FIG. 10, during the first time interval T1, the controller 160 controls the first excitation light source 110 and the supplementary light source 130 to emit the first excitation beam EB1 and the supplementary beam SB, respectively, and turns off the second excitation light source 120. At this time, the non-wavelength conversion region NWCRc enters the transmission path of the first excitation beam EB1 due to rotation of the wavelength conversion element 140c. Descriptions of the optical path of the first excitation beam EB1 is similar to the descriptions of FIG. 9A, and descriptions of an optical path of the supplementary beam SB is similar to the descriptions of FIG. 1E, and therefore the descriptions thereof are omitted herein. At this time, the illumination beam IB output by the illumination system 100f includes the supplementary beam SB.

Figure 9D:
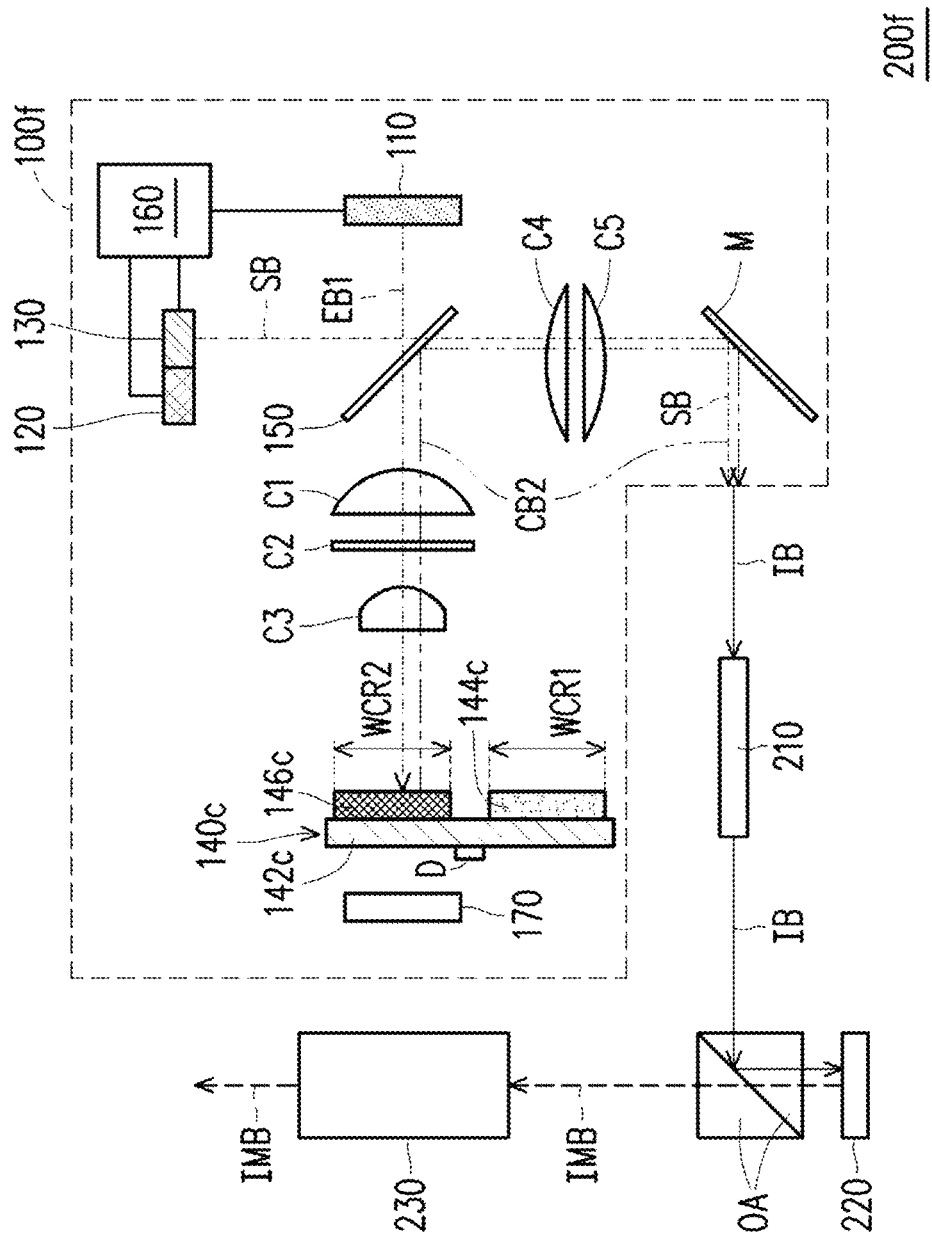

Referring to FIG. 9D and FIG. 10, during the second time interval T2, the controller 160 controls the first excitation light source 110 and the supplementary light source 130 to emit a first excitation beam EB1 and a supplementary beam SB, respectively, and turns off the second excitation light source 120. At this time, the second wavelength conversion region WCR2 enters a transmission path of the first excitation beam EB1 due to rotation of the wavelength conversion element 140c, so as to form a converted beam CB2. Descriptions of optical paths of the first excitation beam EB1, the converted beam CB2, and the supplementary beam SB are similar to the descriptions of FIG. 1G, and therefore the descriptions thereof are omitted herein. At this time, the illumination beam IB output by the illumination system 100f includes the converted beam CB2 and the supplementary beam SB.

Referring to FIG. 9A to FIG. 9D again, descriptions of optical paths of the illumination beam IB and the image beam IMB are substantially similar to descriptions of an optical path of the projection device 200, and therefore the descriptions thereof are omitted herein.

According to the above, in the illumination system 100f and the projection device 200f in the embodiment, during the first time interval T1, the first excitation beam EB1 passes through the hollow region HR, but does not irradiate the wavelength conversion element 140c. In this way, the first excitation beam EB1 is prevented from irradiating the solid material of the wavelength conversion element 140c (the reflecting rotary disk 142c), so that reliability of the wavelength conversion element 140c is prevented from being affected by heat. Therefore, the illumination system 100f and the projection device 200f can have good reliability and optical efficiency.

In addition, since the first excitation light source 110 is always turned on, when the non-wavelength conversion region NWCRc (the hollow region HR) enters the transmission path of the first excitation beam EB1, the first excitation beam EB1 passes through the hollow region HR. The illumination system 100f in the embodiment can absorb the first excitation beam EB1 penetrating the hollow region HR by using the disposed light absorbing member 170, so as to avoid color mixing caused by irradiation on the boundary between the wavelength conversion region WCR and the non-wavelength conversion region NWCR.

FIG. 11A to FIG. 11J are schematic diagrams of optical paths of the projection device according to another embodiment of the invention. FIG. 12 is a schematic top view of a wavelength conversion element according to another embodiment of the invention. FIG. 13 is a timing diagram of different elements in the projection device in FIG. 11A to FIG. 11J.

Referring to FIG. 11A to FIG. 11J and FIG. 12, a projection device 200g and an illumination system 100g in FIG. 11A to FIG. 11J are substantially similar to the projection device 200 and the illumination system 100 in FIG. 1A to FIG. 1D, and a main difference is that a design of a wavelength conversion element 140g used in the illumination system 100g is slightly different. In detail, in the wavelength conversion element 140g, at least one wavelength conversion region WCR1g of the wavelength conversion regions WCR (which are referred to as, for example, a first wavelength conversion region WCR1g and a second wavelength conversion region WCR2, respectively) is provided with a first sub-wavelength conversion region SWCR1 and a second sub-wavelength conversion region SWCR2 connected to each other. The first sub-wavelength conversion region SWCR1 and the second wavelength conversion region SWCR2 are respectively defined by wavelength conversion materials 1441 and 1442 that can emit different colors. A boundary between the first sub-wavelength conversion region SWCR1 and a non-wavelength conversion region NWCR is marked as B1, a boundary between the first sub-wavelength conversion region SWCR1 and the second sub-wavelength conversion region SWCR2 is marked as B', and a boundary between the second sub-wavelength conversion region SWCR2 and the non-wavelength conversion region NWCR is marked as B2, and boundaries between the second wavelength conversion region WCR2 and two non-wavelength conversion regions NWCR are marked as B3 and B4, respectively.

An optical effect of the projection device 200g during one frame is described briefly in the following paragraphs.

Figure 11A:
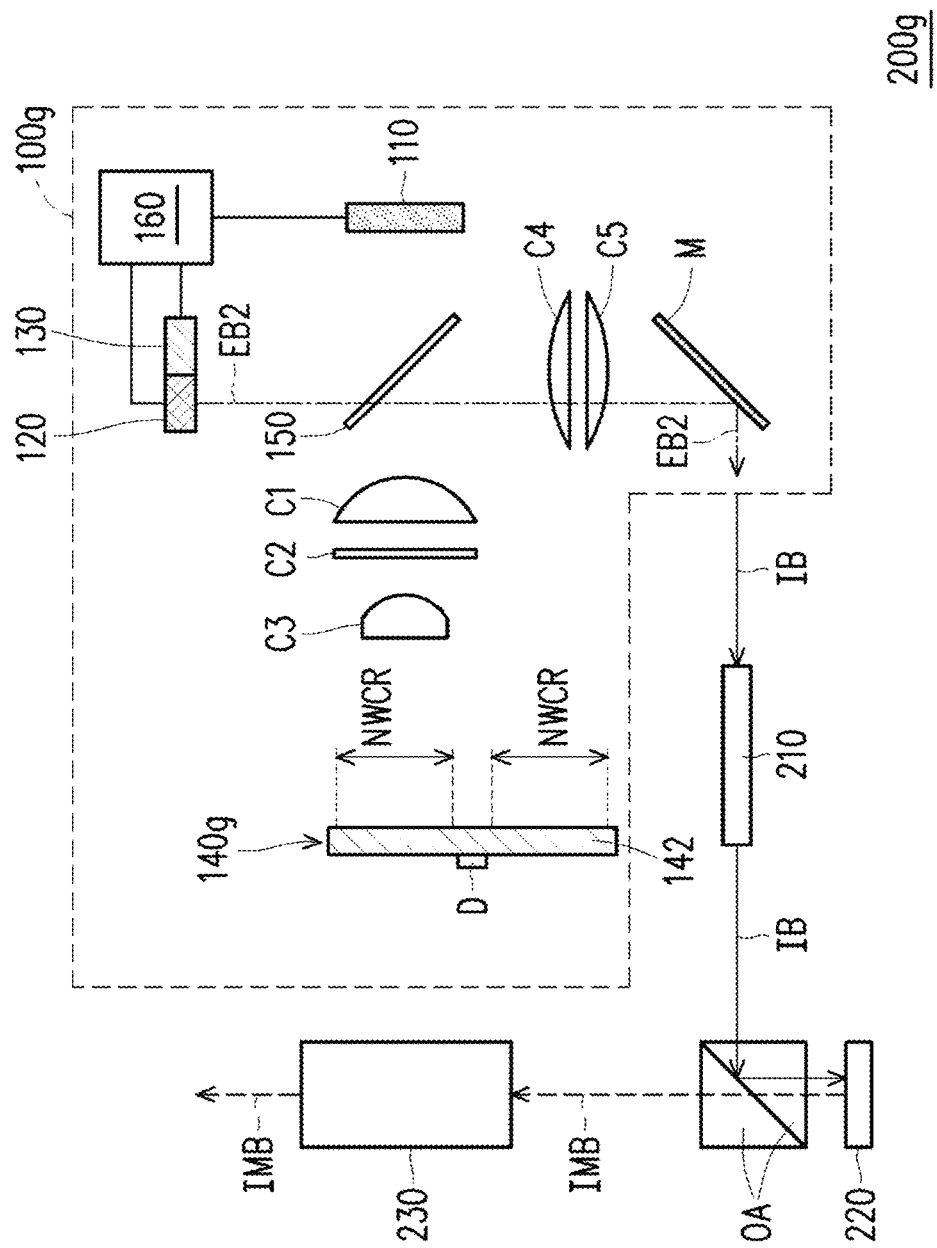
FIG. 11A to FIG. 11J are schematic diagrams of optical paths of the projection device according to another embodiment of the invention.
Figure 12:
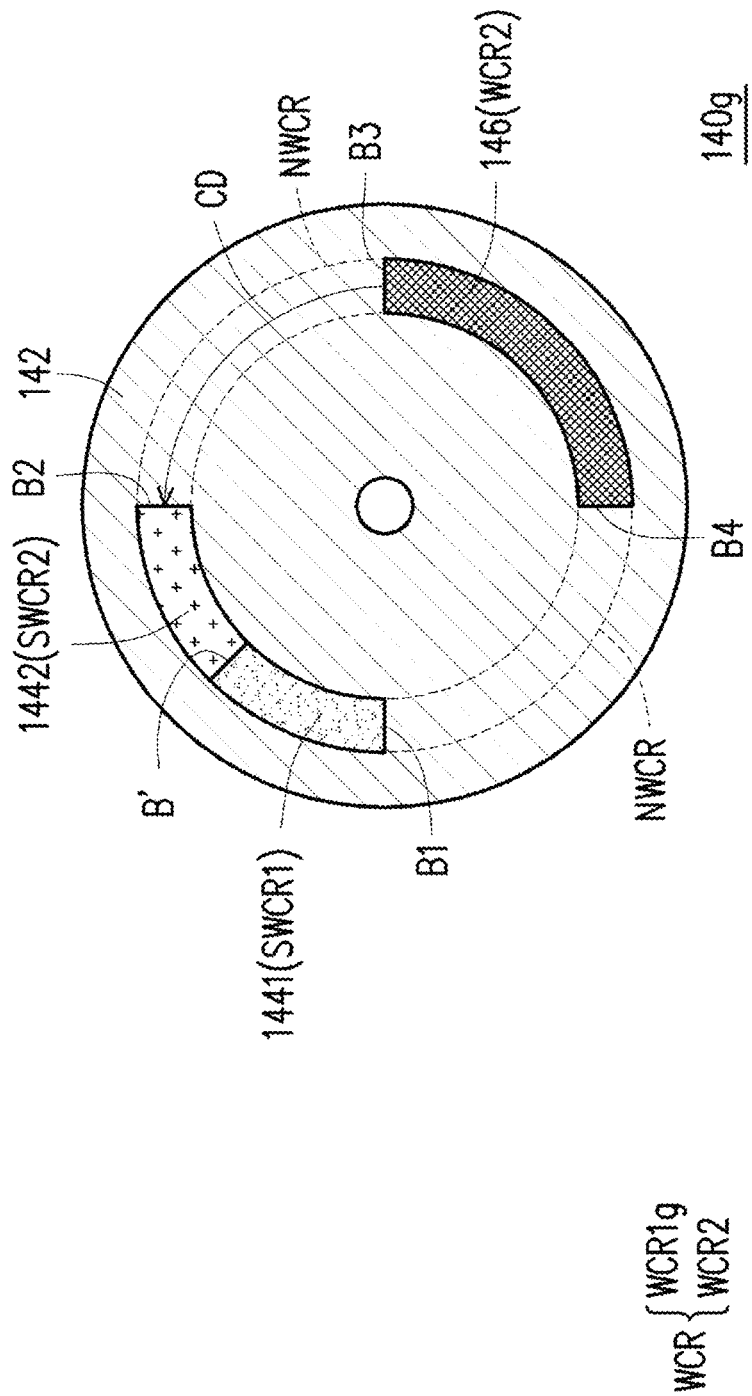
FIG. 12 is a schematic top view of a wavelength conversion element according to another embodiment of the invention.
Figure 13:
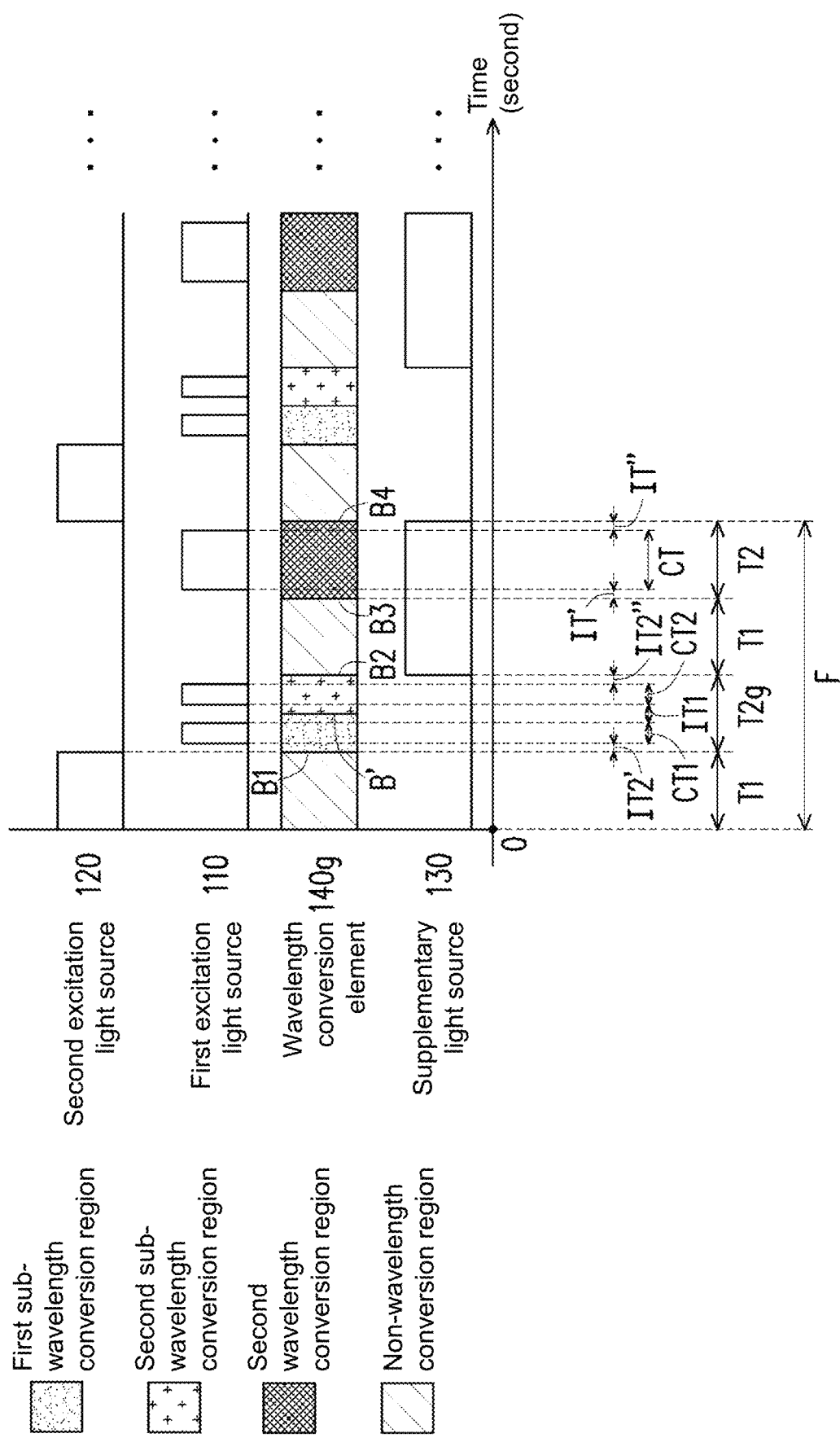
FIG. 13 is a timing diagram of different elements in the projection device in FIG. 11A to FIG. 11J.

Referring to FIG. 11A, FIG. 12 and FIG. 13 first, descriptions of operation manners of elements in the projection device 200g during a first time interval T1 are substantially similar to the descriptions of FIG. 1A, and therefore the descriptions thereof are omitted herein.

According to the different operation manners of the elements, the second time interval T2g further includes a first color time interval CT1 and a second color time interval CT2, a first idle time interval IT1, and two second idle time intervals IT2' and IT2". The first idle time interval IT1 is between the first color time interval CT1 and the second color time interval CT2, and the two second idle time intervals IT2' and IT2" are before the first color time interval CT1 and after the second color time interval CT2, respectively, which can also be referred as previous idle time interval IT2' and post idle time interval IT2". The optical effect of the projection device 200g is described below according to different time intervals.

Figure 11B:
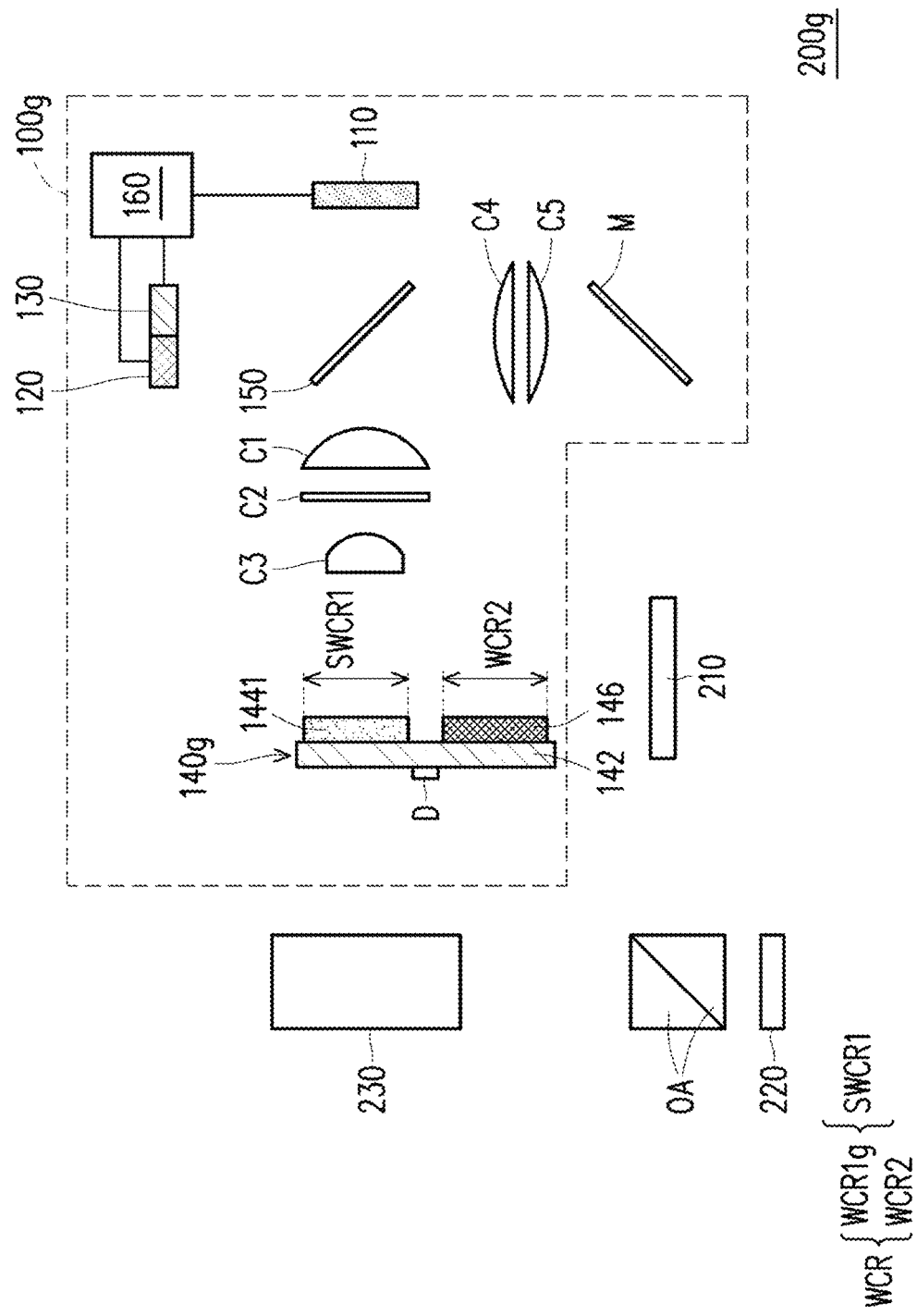

Referring to FIG. 11B, FIG. 12, and FIG. 13 first, during the second idle time interval IT2', the controller 160 turns off the first excitation light source 110, the second excitation light source 120, and the supplementary light source 130. At a start moment of the second idle time interval IT2', a boundary B1 (shown in FIG. 12 and FIG. 13) between the first sub-wavelength conversion region SWCR1 and a non-wavelength conversion region NWCR adjacent to the first sub-wavelength conversion region SWCR1 enters the irradiation range of the first excitation light source 110 due to rotation of the wavelength conversion element 140g, that is, a correspondence between the second idle time interval IT2' and the boundary B1 is shown. At this time, the illumination system 100 does not output the illumination beam IB.

Figure 11C:
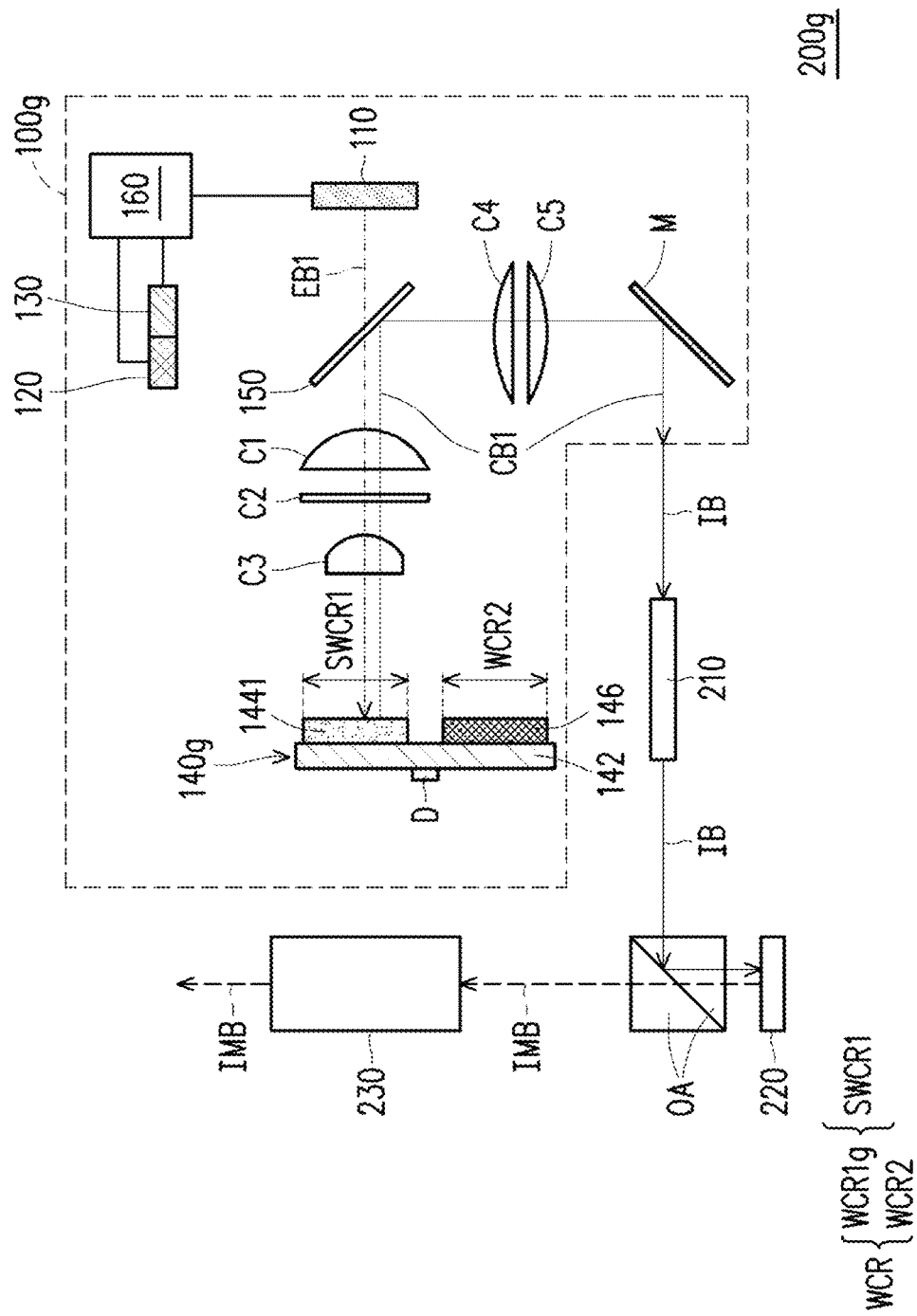

Referring to FIG. 11C, FIG. 12, and FIG. 13, during the first color time interval CT1, the controller 160 controls the first excitation light source 110 to emit a first excitation beam EB1, and turns off the second excitation light source 120 and the supplementary light source 130. At this time, the first sub-wavelength conversion region SWCR1 enters a transmission path of the first excitation beam EB1 due to rotation of the wavelength conversion 140g, so as to form a converted beam CB1. Descriptions of optical paths of the first excitation beam EB1 and the converted beam CB1 are similar to the descriptions of FIG. 1C, and therefore the descriptions thereof are omitted herein. At this time, an illumination beam IB output by the illumination system 100g includes the converted beam CB1.

Figure 11D:
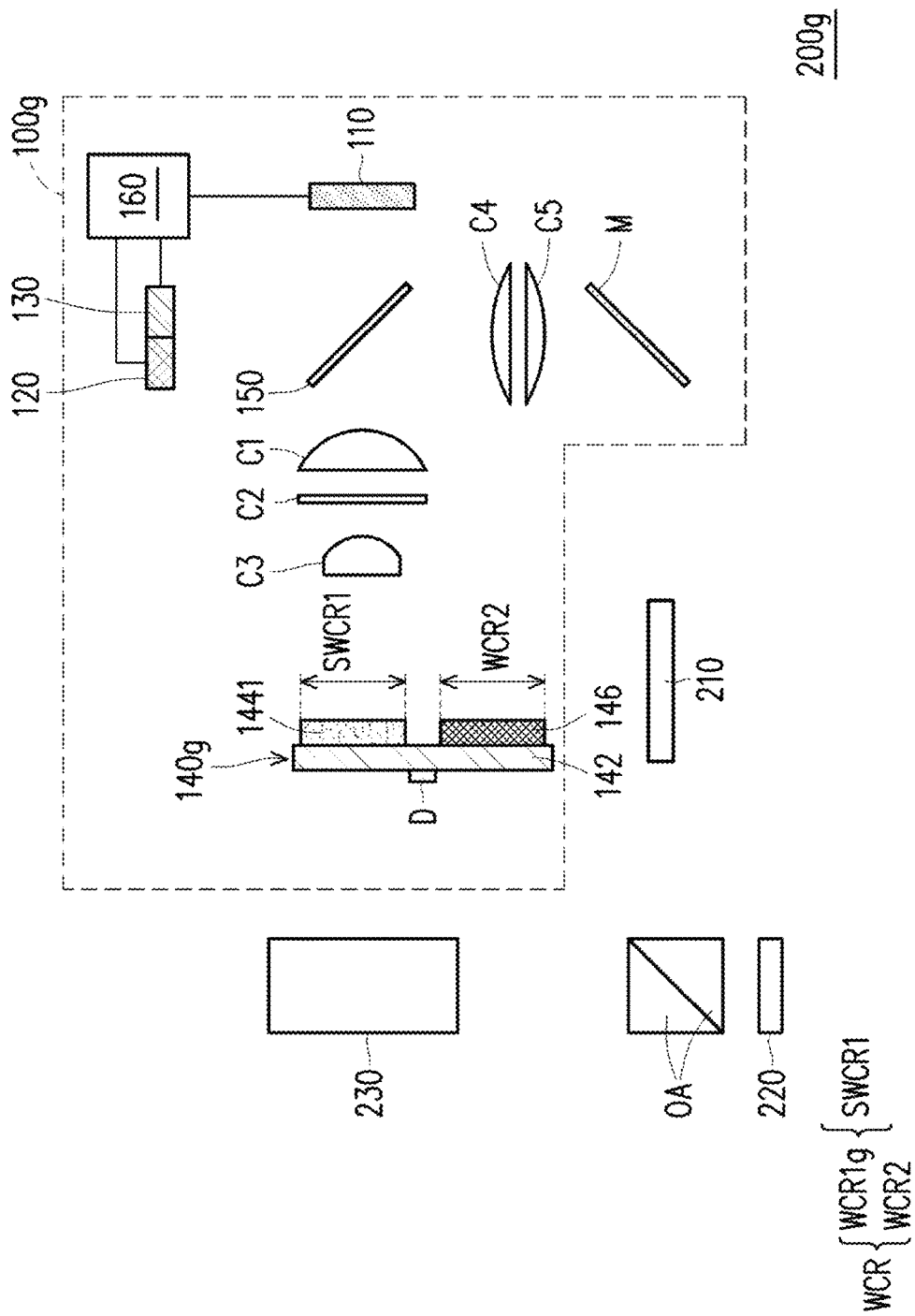

Referring to FIG. 11D, FIG. 12, and FIG. 13, during the first idle time interval IT1, the controller 160 turns off the first excitation light source 110, the second excitation light source 120, and the supplementary light source 130. At a specific moment of the first idle time interval IT1, a boundary B' (shown in FIG. 12 and FIG. 13) between the first sub-wavelength conversion region SWCR1 and the second sub-wavelength conversion region SWCR2 enters the irradiation range of the first excitation light source 110 due to rotation of the wavelength conversion element 140g, that is, a correspondence between the first idle time interval IT1 and the boundary B' is shown. At this time, the illumination system 100g does not output the illumination beam IB.

Figure 11E:
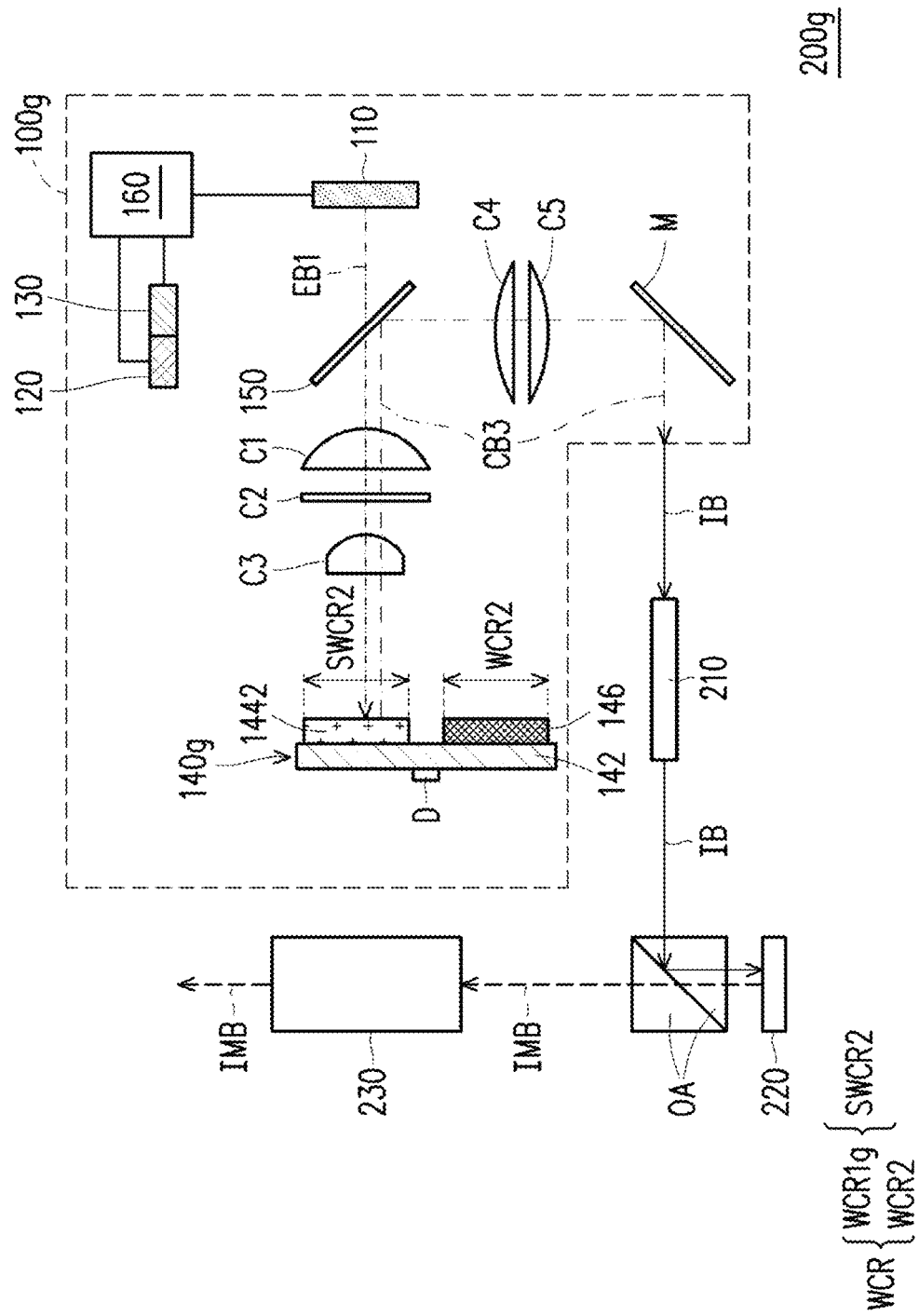

Referring to FIG. 11E, FIG. 12, and FIG. 13, during the second color time interval CT2, the controller 160 controls the first excitation light source 110 to emit a first excitation beam EB1, and turns off the second excitation light source 120 and the supplementary light source 130. At this time, the second sub-wavelength conversion region SWCR2 enters a transmission path of the first excitation beam EB1 due to rotation of the wavelength conversion 140g, so as to form a converted beam CB3. The converted beam CB3 sequentially penetrates the lenses C3 to C1, and is reflected by the beam splitting element 150, and penetrates the lenses C4 and C5, and is reflected by the reflector M, so as to be emitted from the illumination system 100g. Descriptions of an optical path of the first excitation beam EB1 is similar to the descriptions of FIG. 1C, and therefore the descriptions thereof are omitted herein. At this time, the illumination beam IB output by the illumination system 100g includes the converted beam CB3. In addition, colors of the converted beams CB1 and CB3 formed in the first sub-wavelength conversion region SWCR1 and the second sub-wavelength conversion region SWCR2 respectively are different from each other.

Figure 11F:
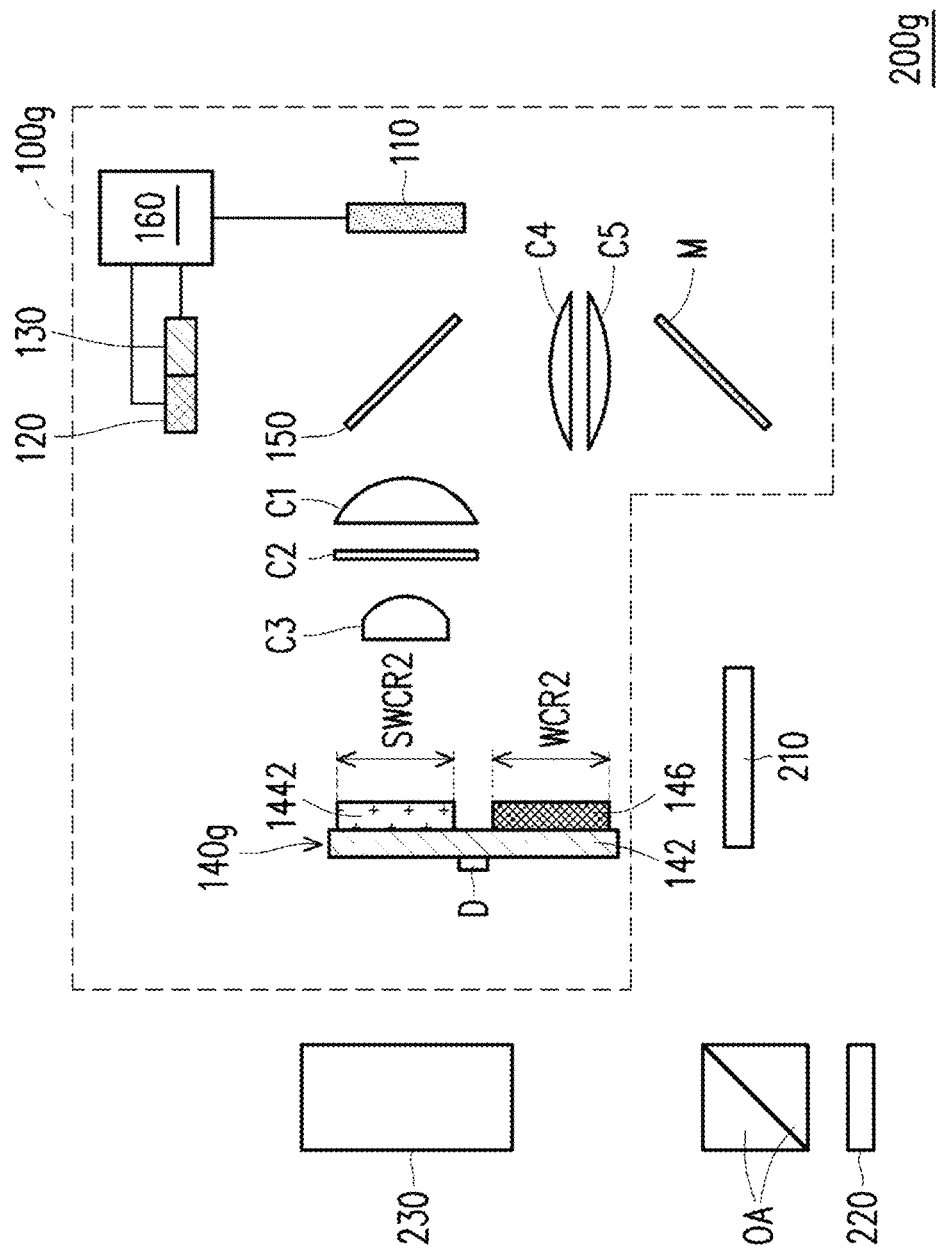

Referring to FIG. 11F, FIG. 12, and FIG. 13, during the second idle time interval IT2", the controller 160 turns off the first excitation light source 110, the second excitation light source 120, and the supplementary light source 130. At an end moment of the second idle time interval IT2", a boundary B2 (shown in FIG. 12 and FIG. 13) between the second sub-wavelength conversion region SWCR2 and a non-wavelength conversion region NWCR adjacent to the second sub-wavelength conversion region SWCR2 enters the irradiation range of the first excitation light source 110 due to rotation of the wavelength conversion element 140g. At this time, the illumination system 100g does not output the illumination beam IB.

So far, description of the optical effect of the projection device 200g during the second time interval T2g is substantially completed.

Figure 11G:
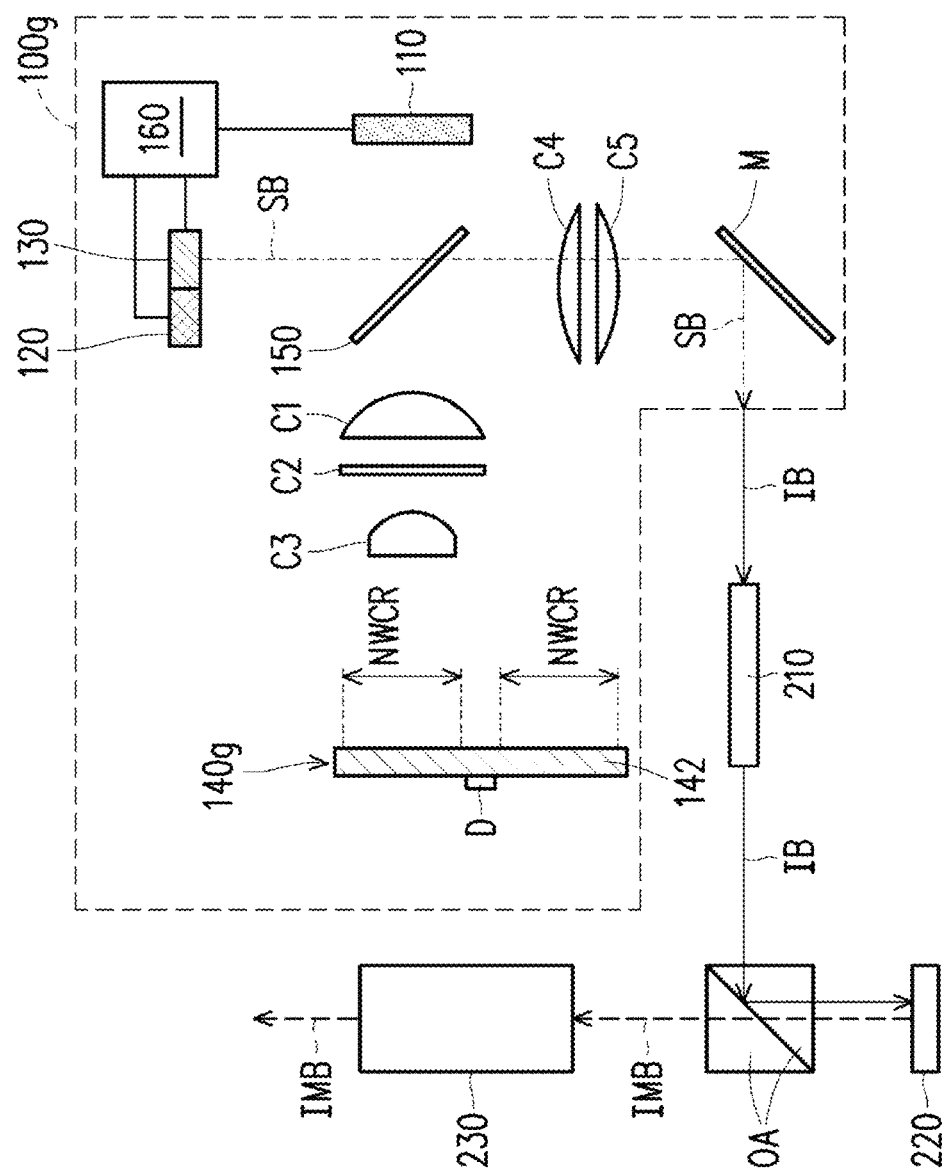

Referring to FIG. 11G, FIG. 12, and FIG. 13, descriptions of operation manners of elements in the projection device 200g during the first time interval T1 are substantially similar to the descriptions of FIG. 1E, and therefore the descriptions thereof are omitted herein.

Figure 11H:
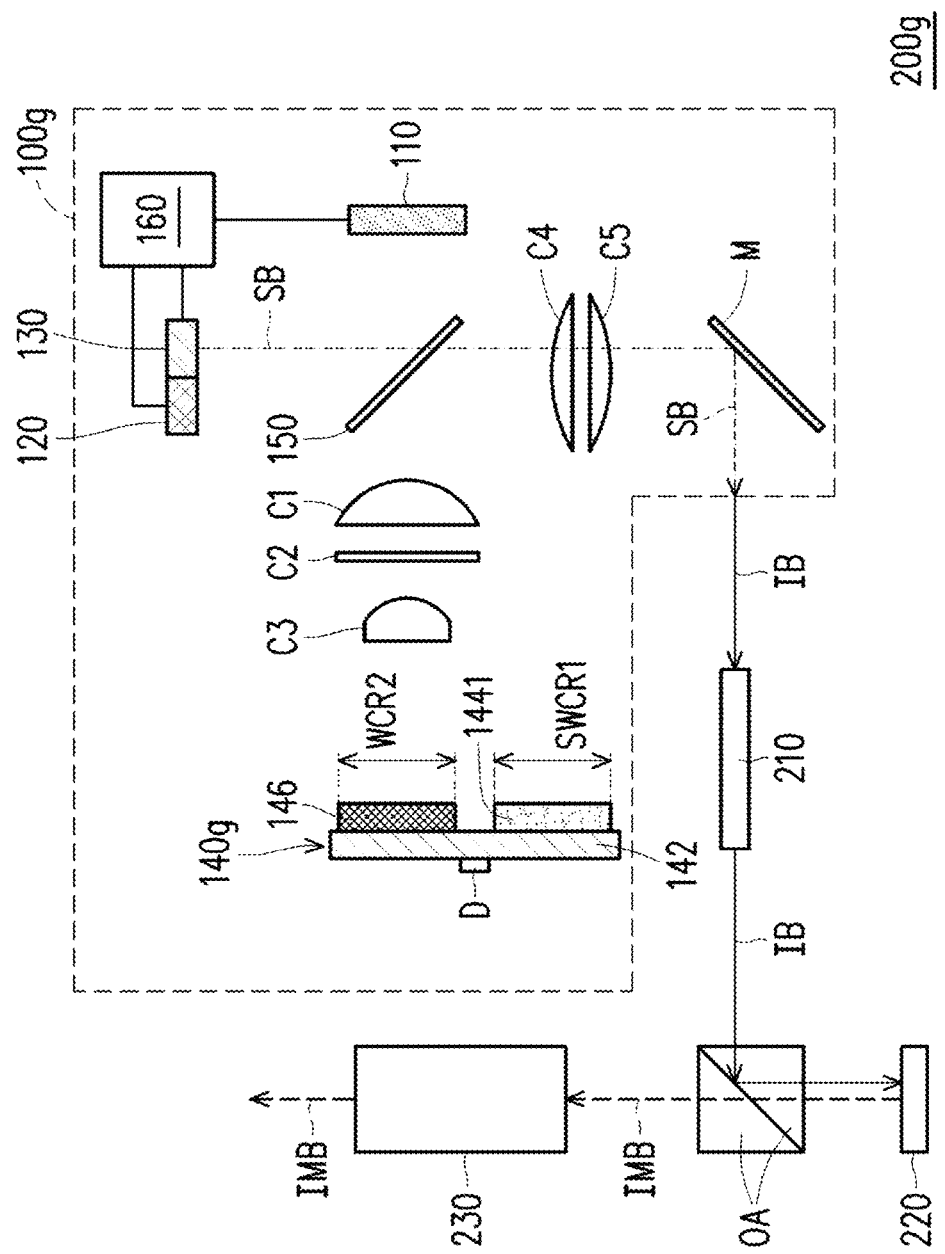

Referring to FIG. 11H, FIG. 12, and FIG. 13, descriptions of operation manners of elements in the projection device 200g during the idle time interval IT' are substantially similar to the descriptions of FIG. 1F, and therefore the descriptions thereof are omitted herein.

Figure 11I:
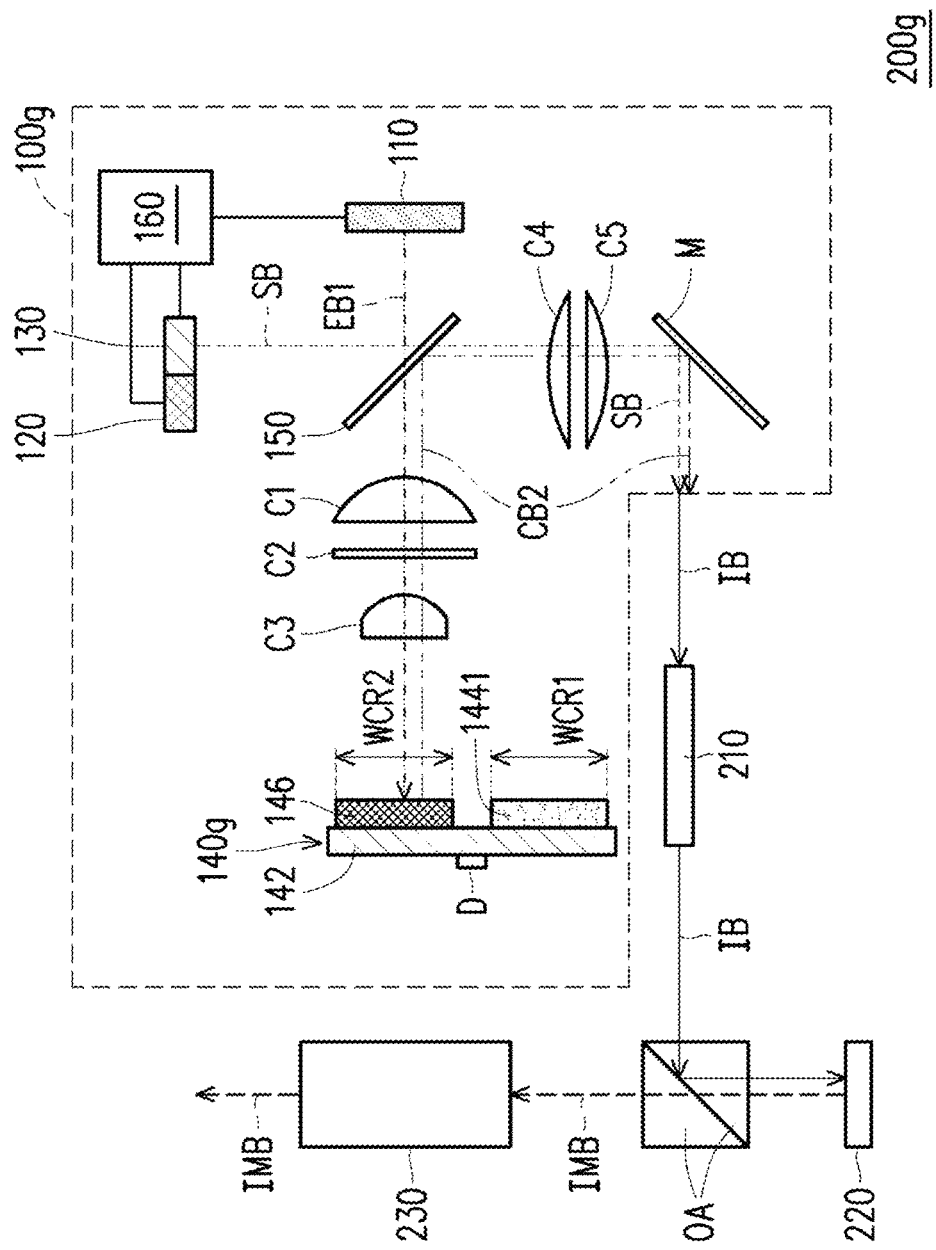

Referring to FIG. 11I, FIG. 12, and FIG. 13, descriptions of operation manners of elements in the projection device 200g during the color time interval CT are substantially similar to the descriptions of FIG. 1G, and therefore the descriptions thereof are omitted herein.

Figure 11J:
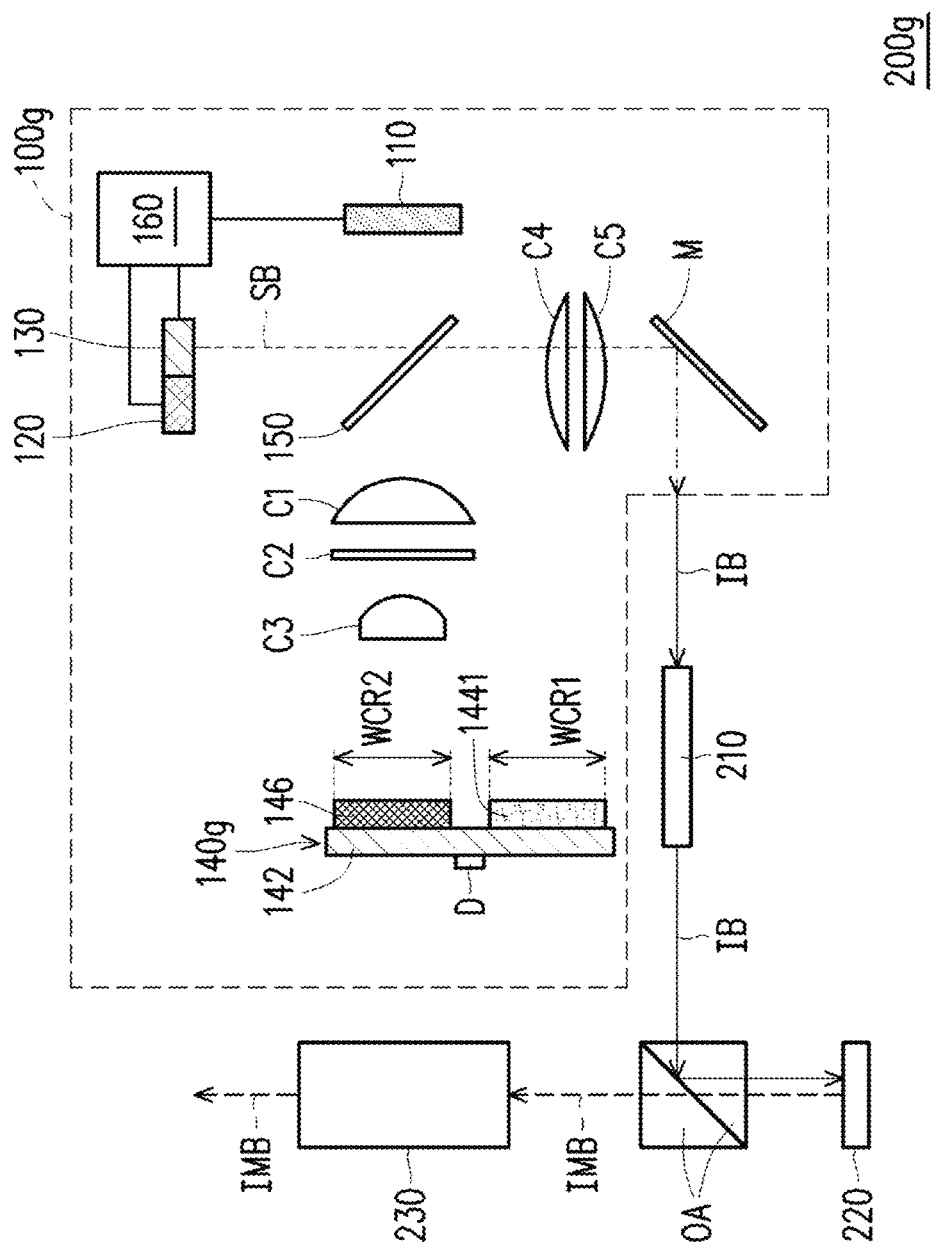

Referring to FIG. 11J, FIG. 12, and FIG. 13, descriptions of operation manners of elements in the projection device 200g during the idle time interval IT" are substantially similar to the descriptions of FIG. 1H, and therefore the descriptions thereof are omitted herein.

In addition, descriptions of optical paths of the illumination beam IB and the image beam IMB in FIG. 11A to FIG. 11J are substantially similar to descriptions of the optical path of the projection device 200, and therefore the descriptions thereof are omitted herein.

According to the above, during the first idle time interval IT1 and the two idle time intervals IT2' and IT2" of the second time interval T2g, the controller 160 turns off the first excitation light source 110. In this way, color mixing caused by irradiation of the first excitation beam EB1 on the boundary between the wavelength conversion region WCR and the non-wavelength conversion region NWCR can be avoided. Therefore, the light output by the projection device 200g has a more pure color. However, in other embodiments, the first idle time interval IT1 and the two idle time intervals IT2' and IT2" may also be 0 according to configurations and setting of other elements, but the invention is not limited thereto.

It should be noted that in the above embodiment, the controller 160 controls the second excitation light source 120 and the supplementary light source 130 to emit light at some specific timings but not to emit light at other timings. However, in other embodiments, the controller 160 may also control, according to different color requirements, the second excitation light source 120 and the supplementary light source 130 to emit beams at an appropriate timing. For example, the controller 160 may control the supplementary light source 130 to emit light during the first time interval T1. In other words, those skilled in the art may cause, according to the color requirements, the controller 160 to control the second excitation light source 120 and the supplementary light source 130 to selectively emit the second excitation beam EB2 and the supplementary beam SB during the first time interval T1 and the second time interval T2, so that the second excitation beam EB2 or the supplementary beam SB is selectively used as at least a part of the illumination beam IB. The invention is not limited thereto.

Based on the above, in the illumination system and the projection device in the embodiments of the invention, the first excitation beam penetrates the hollow region or is controlled not to irradiate a solid material. In these manners, reliability of the wavelength conversion element is prevented from being affected by heat generated when the first excitation beam irradiates a solid material. Therefore, the illumination system and the projection device can have good reliability and optical efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination beam and comprising a first excitation light source, a wavelength conversion element, and a controller, wherein
    the first excitation light source is configured to provide a first excitation beam;
    the wavelength conversion element is located on a transmission path of the first excitation beam and comprises a plurality of wavelength conversion regions and a plurality of non-wavelength conversion regions alternately arranged in a circumferential direction; and
    the controller controls whether the first excitation light source emits the first excitation beam, wherein
    during a first time interval, the controller turns off the first excitation light source; and
    during a second time interval, the controller controls the first excitation light source to emit the first excitation beam, and the first excitation beam is transmitted to one of the plurality of wavelength conversion regions to form a converted beam, wherein the illumination beam comprises the converted beam,
    wherein the second time interval further comprises a color time interval, a previous idle time interval, and a post idle time interval, the previous idle time interval is before the color time interval, and the post idle time interval is after the color time interval, wherein
    during the color time interval, the controller controls the first excitation light source to emit the first excitation beam, and the first excitation beam is transmitted to one of the plurality of wavelength conversion regions;
    during the previous idle time interval, the controller turns off the first excitation light source, and the previous idle time interval corresponds to a boundary between one of the plurality of wavelength conversion regions and one of the non-wavelength conversion regions adjacent to the one of the plurality of wavelength conversion regions; and
    during the post idle time interval, the controller turns off the first excitation light source, and the post idle time interval corresponds to a boundary between the one of the plurality of wavelength conversion regions and the other one of the non-wavelength conversion regions adjacent to the one of the plurality of wavelength conversion regions.

2. The illumination system according to claim 1, wherein each of the non-wavelength conversion regions comprises a solid material, and the solid material is a reflective solid material.

3. The illumination system according to claim 1, wherein each of the non-wavelength conversion regions comprises a hollow region or a solid material, and the solid material is a light-transmissive solid material.

4. The illumination system according to claim 1, wherein the wavelength conversion element further comprises a rotary disk, and the rotary disk comprises a plurality of fan-shaped portions, wherein the plurality of wavelength conversion regions are respectively located on the plurality of fan-shaped portions, and each of the non-wavelength conversion regions is located between two of the fan-shaped portions.

5. The illumination system according to claim 1, further comprising:
    a second excitation light source, configured to provide a second excitation beam; and
    a supplementary light source, configured to provide a supplementary beam, wherein the controller controls whether the second excitation light source and the supplementary light source emit light, wherein
    during the first time interval and the second time interval, the controller controls the second excitation light source and the supplementary light source to selectively emit the second excitation beam and the supplementary beam, so that the second excitation beam or the supplementary beam is selectively used as at least a part of the illumination beam.

6. An illumination system, configured to provide an illumination beam and comprising a first excitation light source, a wavelength conversion element, and a controller, wherein
the first excitation light source is configured to provide a first excitation beam;
the wavelength conversion element is located on a transmission path of the first excitation beam and comprises a plurality of wavelength conversion regions and a plurality of non-wavelength conversion regions alternately arranged in a circumferential direction; and
the controller controls whether the first excitation light source emits the first excitation beam, wherein
during a first time interval, the controller turns off the first excitation light source; and
during a second time interval, the controller controls the first excitation light source to emit the first excitation beam, and the first excitation beam is transmitted to one of the plurality of wavelength conversion regions to form a converted beam, wherein the illumination beam comprises the converted beam,
wherein the wavelength conversion element further comprises a rotary disk, and the rotary disk comprises a body portion and a plurality of extension portions extending outward from the body portion and separated from each other in the circumferential direction, the plurality of wavelength conversion regions are respectively located on the plurality of extension portions, and each of the non-wavelength conversion regions is located between two of the extension portions.

7. The illumination system according to claim 1, wherein the plurality of wavelength conversion regions comprise at least one first wavelength conversion region and at least one second wavelength conversion region, and colors of converted beams respectively formed by the plurality of wavelength conversion regions are the same.

8. The illumination system according to claim 1, wherein the plurality of wavelength conversion regions comprise at least one first wavelength conversion region and at least one second wavelength conversion region, and colors of converted beams respectively formed by the first wavelength conversion region and the second wavelength conversion region are different from each other.

9. An illumination system, configured to provide an illumination beam and comprising a first excitation light source, a wavelength conversion element, and a controller, wherein
the first excitation light source is configured to provide a first excitation beam;
the wavelength conversion element is located on a transmission path of the first excitation beam and comprises a plurality of wavelength conversion regions and a plurality of non-wavelength conversion regions alternately arranged in a circumferential direction; and
the controller controls whether the first excitation light source emits the first excitation beam, wherein
during a first time interval, the controller turns off the first excitation light source; and
during a second time interval, the controller controls the first excitation light source to emit the first excitation beam, and the first excitation beam is transmitted to one of the plurality of wavelength conversion regions to form a converted beam, wherein the illumination beam comprises the converted beam,
wherein at least one of the plurality of wavelength conversion regions is provided with a first sub-wavelength conversion region and a second sub-wavelength conversion region connected to each other, and colors of converted beams respectively formed by the first sub-wavelength conversion region and the second sub-wavelength conversion region are different from each other, wherein
the second time interval further comprises a first color time interval, a second color time interval, a first idle time interval, a previous idle time interval, and a post idle time interval, the first idle time interval is between the first color time interval and the second color time interval, the previous idle time interval is before the first color time interval, and the post idle time interval is after the second color time interval, wherein
during the first color time interval and the second color time interval, the controller controls the first excitation light source to emit light, and the first excitation beam is respectively transmitted to the first sub-wavelength conversion region and the second sub-wavelength conversion region;
during the first idle time interval a, the controller turns off the first excitation light source, the first idle time interval corresponds to a boundary between the first sub-wavelength conversion region and the second sub-wavelength conversion region;
during the previous idle time interval, the controller turns off the first excitation light source, the previous idle time interval corresponds to a boundary between the first sub-wavelength conversion region and one of the non-wavelength conversion regions adjacent to the first sub-wavelength conversion region; and
during the post idle time interval, the controller turns off the first excitation light source, the post idle time interval corresponds to a boundary between the second sub-wavelength conversion region and the other one of the non-wavelength conversion regions adjacent to the second sub-wavelength conversion region.

10. An illumination system, configured to provide an illumination beam and comprising a first excitation light source, a wavelength conversion element, and a controller, wherein
the first excitation light source is configured to provide a first excitation beam;
the wavelength conversion element is located on a transmission path of the first excitation beam and comprises a plurality of wavelength conversion regions and a plurality of non-wavelength conversion regions alternately arranged in a circumferential direction, wherein each of the non-wavelength conversion regions comprises a hollow region; and
the controller controls whether the first excitation light source emits the first excitation beam, wherein
during a first time interval, the controller controls the first excitation light source to emit the first excitation beam, so that the first excitation beam is transmitted to and penetrates one of the plurality of non-wavelength conversion regions; and
during a second time interval, the controller controls the first excitation light source to emit the first excitation beam, and the first excitation beam is transmitted to one of the plurality of wavelength conversion regions to form a converted beam, wherein the illumination beam comprises the converted beam.

11. The illumination system according to claim 10, further comprising a light absorbing member, located on a transmission path of the first excitation beam penetrating the one of the plurality of non-wavelength conversion regions and configured to absorb the first excitation beam penetrating the one of the plurality of non-wavelength conversion regions.

12. The illumination system according to claim 10, wherein the wavelength conversion element further comprises a rotary disk, and the rotary disk comprises a plurality of fan-shaped portions, wherein the plurality of wavelength conversion regions are respectively located on the plurality of fan-shaped portions, and each of the non-wavelength conversion regions is located between two of the fan-shaped portions.

13. The illumination system according to claim 10, wherein the wavelength conversion element further comprises a rotary disk, and the rotary disk comprises a body portion and a plurality of extension portions extending outward from the body portion and separated from each other in the circumferential direction, the plurality of wavelength conversion regions are respectively located on the plurality of extension portions, and each of the non-wavelength conversion regions is located between two of the extension portions.

14. The illumination system according to claim 10, wherein the plurality of wavelength conversion regions comprise at least one first wavelength conversion region and at least one second wavelength conversion region, and colors of converted beams respectively formed by the plurality of wavelength conversion regions are the same.

15. The illumination system according to claim 10, wherein the plurality of wavelength conversion regions comprise at least one first wavelength conversion region and at least one second wavelength conversion region, and colors of converted beams formed by the first wavelength conversion region and the second wavelength conversion region respectively are different from each other.

16. The illumination system according to claim 10, wherein at least one of the plurality of wavelength conversion regions is provided with a first sub-wavelength conversion region and a second sub-wavelength conversion region connected to each other, and colors of converted beams respectively formed by the first sub-wavelength conversion region and the second sub-wavelength conversion region are different from each other.

17. The illumination system according to claim 10, further comprising:
a second excitation light source, configured to provide a second excitation beam; and
a supplementary light source, configured to provide a supplementary beam, wherein the controller controls whether the second excitation light source and the supplementary light source emit light, wherein
during the first time interval and the second time interval, the controller controls the second excitation light source and the supplementary light source to selectively emit the second excitation beam and the supplementary beam, so that the second excitation beam or the supplementary beam is selectively used as at least a part of the illumination beam.

18. A projection device, comprising an illumination system, a light valve, and a projection lens, wherein
the illumination system is configured to provide an illumination beam and comprises a first excitation light source, a wavelength conversion element, and a controller, wherein
the first excitation light source is configured to provide a first excitation beam;
the wavelength conversion element is located on a transmission path of the first excitation beam and comprises a plurality of wavelength conversion regions and a plurality of non-wavelength conversion regions alternately arranged in a circumferential direction; and
the controller controls whether the first excitation light source emits the first excitation beam, wherein
during a first time interval, the controller turns off the first excitation light source; and
during a second time interval, the controller controls the first excitation light source to emit the first excitation beam, and the first excitation beam is transmitted to one of the plurality of wavelength conversion regions to form a converted beam, wherein the illumination beam comprises the converted beam,
wherein the second time interval further comprises a color time interval, a previous idle time interval, and a post idle time interval, the previous idle time interval is before the color time interval, and the post idle time interval is after the color time interval, wherein
during the color time interval, the controller controls the first excitation light source to emit the first excitation beam, and the first excitation beam is transmitted to one of the plurality of wavelength conversion regions;
during the previous idle time interval, the controller turns off the first excitation light source, and the previous idle time interval corresponds to a boundary between one of the plurality of wavelength conversion regions and one of the non-wavelength conversion regions adjacent to the one of the plurality of wavelength conversion regions; and
during the post idle time interval, the controller turns off the first excitation light source, and the post idle time interval corresponds to a boundary between the one of the plurality of wavelength conversion regions and the other one of the non-wavelength conversion regions adjacent to the one of the plurality of wavelength conversion regions;
the light valve is disposed on a transmission path of the illumination beam and converts the illumination beam into an image beam; and
the projection lens is disposed on a transmission path of the image beam.

19. A projection device, comprising an illumination system, a light valve, and a projection lens, wherein
the illumination system is configured to provide an illumination beam and comprises a first excitation light source, a wavelength conversion element, and a controller, wherein
the first excitation light source is configured to provide a first excitation beam;
the wavelength conversion element is located on a transmission path of the first excitation beam and comprises a plurality of wavelength conversion regions and a plurality of non-wavelength conversion regions alternately arranged in a circumferential direction, wherein each of the non-wavelength conversion regions comprises a hollow region; and
the controller controls whether the first excitation light source emits the first excitation beam, wherein
during a first time interval, the controller controls the first excitation light source to emit the first excitation beam, so that the first excitation beam is transmitted to and penetrates one of the plurality of non-wavelength conversion regions; and
during a second time interval, the controller controls the first excitation light source to emit the first excitation beam, and the first excitation beam is transmitted to one of the plurality of wavelength conversion regions to form a converted beam, wherein the illumination beam comprises the converted beam;

the light valve is disposed on a transmission path of the illumination beam and converts the illumination beam into an image beam; and the projection lens is disposed on a transmission path of the image beam.

* * * * *